(12) United States Patent
Vion-Drury

(10) Patent No.: US 9,323,742 B2
(45) Date of Patent: Apr. 26, 2016

(54) METHOD AND APPARATUS FOR PROVIDING SEMANTIC DATA ARCHITECTURE

(71) Applicant: Xerox Corporation, Norwalk, CT (US)

(72) Inventor: Jean-Yves Vion-Drury, St. Ismier (FR)

(73) Assignee: XEROX CORPORATION, Norwalk, CT (US)

( * ) Notice: Subject to any disclaimer, the term of this patent is extended or adjusted under 35 U.S.C. 154(b) by 15 days.

(21) Appl. No.: 14/299,620

(22) Filed: Jun. 9, 2014

(65) Prior Publication Data

US 2015/0356073 A1    Dec. 10, 2015

(51) Int. Cl.
*G06F 17/27* (2006.01)
*G10L 15/18* (2013.01)

(52) U.S. Cl.
CPC ........ *G06F 17/2785* (2013.01); *G10L 15/1815* (2013.01)

(58) Field of Classification Search
CPC .............. G06F 17/2785; G06F 17/271; G06F 17/30684; G06F 17/30731; G06F 17/2735; G06F 17/27; G06F 17/274; G06F 17/30616; G06F 17/2872; G06F 17/30663; G06F 17/27
USPC ................ 704/1–10, 257; 707/797, E17.098, 707/E17.071, E17.084
See application file for complete search history.

(56) References Cited

U.S. PATENT DOCUMENTS

| | | | | |
|---|---|---|---|---|
| 7,167,848 B2* | 1/2007 | Boukouvalas | ...... | G06F 17/2247 706/14 |
| 7,506,371 B1* | 3/2009 | Ben-Natan | ............ | G06F 21/316 726/18 |
| 8,875,110 B2* | 10/2014 | Lee | ...................... | G06F 11/3604 717/142 |

OTHER PUBLICATIONS

Wielemaker et al., Prolog-based infrastructure for RDF: performance and scalability, The Semantic Web—ISWC 2003, Proceedings of the Second International Semantic Web Conference, Sanibel Island, FL, USA, Oct. 20-23, 2003, pp. 644-658.

Wielemaker et al., Using Prolog as the fundament for applications on the semantic web, Proceedings of ALPSWS 2007, 2007, pp. 84-98.

(Continued)

*Primary Examiner* — Marivelisse Santiago Cordero
*Assistant Examiner* — Stephen Brinich
(74) *Attorney, Agent, or Firm* — Fay Sharpe LLP

(57) ABSTRACT

A method of providing a semantic data architecture includes providing a data model layer. The data model layer is formed by a processor, a storage device, a memory, and a communication interface in combination with a data model application program stored in the storage device. The processor, running the data model application program, is configured to use the storage device, memory, and communication interface to selectively receive source data from a source device, process the corresponding source data based on pre-defined data types and filtering terms to form semantic data arranged in a binary tree structure, and store the semantic data in the storage device. The method also includes providing a data filtering layer. The method may also include providing memory model, general purpose parser, backward inference, primitive functions, rewriting engine, and reasoning engine layers in various combinations. An apparatus for providing a semantic data architecture is also provided.

20 Claims, 6 Drawing Sheets

(56) References Cited

OTHER PUBLICATIONS

Cali et al., A General Datalog-Based Framework for Tractable Query Answering over Ontologies, Web Semantics: Science, Services and Agents on the World Wide Web, North America, Apr. 14, 2012, 79 pages.
Reasoners and rule engines: Jena inference support. Apache Jena Documentation, The Apache Software Foundation, Copyright 2011-2013, printed from http://jena.apache.org/documentation/inference/ on Nov. 25, 2013, 33 pages.
Definite Clause Grammar, Wikipedia, last modified Sep. 17, 2013, printed from http://en.wikipedia.org/ wiki/Definite_ clause_ grammar on Nov. 27, 2013, 7pages.
OWL 2 RL in RIF (Second Edition), W3C Working Group Note, Feb. 5, 2013, 128 pages.
OWL 2 Web Ontology Language Profiles (Second Edition), W3C Recommendation, Dec. 11, 2012, 43 pages.
Signore, Representing Knowledge in the Semantic Web, World Wide Web Consortium (W3C), Milano, Italy, Jun. 29, 2005, printed from www.w3c.it/ talks/ 2005/ openCulture/ on Mar. 13, 2014, 29 pages.
Gerber et al., A Functional Semantic Web Architecture, ESWC 2008, Proceedings of the 5th European Semantic Web Conference, 2008, pp. 273-287.
Gerber et al., Towards a Semantic Web Layered Architecture, SE 2007, Proceedings of the 25th Conference on IASTED 2007, pp. 353-362.
Gerber, Towards a Comprehensive Functional Layered Architecture for the Semantic Web , Chapter 7—Towards a Comprehensive and Functional Layered Architecture for the Semantic Web, Doctor's Thesis in Computer Science, University of South Africa, Nov. 2006, pp. 177-216.
RDF 1.1 Primer, W3C Working Group Note, Feb. 25, 2014, 14 pages.
RDF 1.1 Concepts and Abstract Syntax, W3C Recommendation, Feb. 25, 2014, 23 pages.

* cited by examiner

| Filtering term | resulting substitution | comment |
|---|---|---|
| Add[?x, Mul[?y,z]] | {?x↦1, ?y↦1} | linear matching on variable ?x |
| Add[?x,Mul[?x,z]] | {?x↦1} | simulate high - order matching |
| ?f [?x,z]] | {?f ↦Add, ?x↦1, ?y↦Mul[1,z]} | bad constructor (@1 vs @2) |
| ?(?,?) | none | discriminative matching on z |
| Add[?, Mul[?,?:symb]] | {} | ?x maps to a list of size 1 |
| Add[? | ?x] | {?x↦(Mul[1,z] nil)} | |

FIG. 1

| Filtering term | resulting substitution | comment |
|---|---|---|
| Add[?x, Mul[?y, z]] | {?x↦?x, ?y↦?y} | linear matching on level 2 variable ??x |
| Add[??x, Mul[??x,z]] | {??x↦?x} | |

FIG. 2

| arity | primitive $P$ | eval($C,P$) |
|---|---|---|
| 1 | READ ($t$) | for $c, \phi \in$ eval($C$, read($t$)){yield ($c,\phi$)} |
| 1 | PUT ($t$) | for $c,\phi \in$ eval ($C$,put ($t$)){yield ($c,\phi$)} |
| 1 | GET ($t$) | for $c,\phi \in$ eval ($C$,get ($t$)){yield ($c,\phi$)} |
| 2 | MATCH ($t_1,t_2$) | if match ($t_1,t_2$) = $\phi$ {yield $C, \phi$} |
| 2 | SMATCH ($t_1,t_2$) | if Smatch ($t_1,t_2$) = $\phi$ {yield $C, \phi$} |
| 2 | REFRESH ($t_1,t_2$) | if match (refresh ($t_1$),$t_2$) = $\phi$ {yield $C, \phi$} |
| > 1 | OR ($t_1 | t_2$) | found: = false<br>for $c, \phi \in$ eval ($C,t_1$){found:=true; yield ($c, \phi$)}<br>if not found{for $c,\phi \in$ eval($C$, (@1 (OR $t_2$)){yield ($c,\phi$))} |
| > 1 | AND ($t_1 | t_2$) | for $c, \phi \in$ eval ($C$, inferList ($t_1 | t_2$){yield ($c, \phi$)} |
| 1 | UNION ($t_1 | t_2$) | for $c, \phi \in$ eval ($C, t_1$){yield($c, \phi$)}<br>if! = nil{for $c, \phi \in$ eval($C$, (@1 (UNION $t_2$)){yield($c, \phi$))} |
| 1 | FIRST ($t$) | for $c, \phi \in$ eval ($C,t$){yield ($c, \phi$); break} |
| 1 | NO ($t$) | for $c, \phi \in$ eval ($C,t$){break}elseyield($C, \phi$) |
| 0 | YES ( ) | yield ($C, \phi$) |
| 3 | IF ($t_1,t_2,t_3$) | found: = false<br>for $c_1, \phi_1 \in$ eval ($C,t_1$){<br>for $c_2, \phi_2 \in$ eval ($c_1, \phi_1$ ($t_2$)){found: = true; yield ($c_2, \phi_2$)}<br>}<br>if not found {for $c_3, \phi_3 \in$ eval($C, t_3$){yield ($c_3, \phi_3$)}} |
| 3 | IF - ONE ($t_1,t_2,t_3$) | for $c_1, \phi_1 \in$ eval ($C,t_1$){<br>for $c_2, \phi_2 \in$ eval ($c_1, \phi_1$ ($t_2$)){yield ($c_2, \phi_2$)}<br>break<br>}<br>else{for $c_3, \phi_3 \in$ eval($C, t_3$){yield ($c_3, \phi_3$)}} |

*FIG. 3*

| tactic | definition |
|---|---|
| ground<br>first(?)<br>and(?,?)<br>apply(??:symb) | Solve(?g, ground) ⇐ READ(?g)<br>Solve(?g, first(?t)) ⇐ FIRST(Solve(?g,?t))<br>Solve(?g, and (?t,?t')) ⇐ AND (Solve (?g, ?t), Solve (?g, ?t'))<br>Solve(?g, apply(?nm:symb)) ⇐ READ(TACTIC(?nm:symb, ?t)), Solve(?g,?t) |
| --<br>--<br>--<br>--<br>-- | Solve(?g, ground) ⇐ Solve(?g, meta(ground))<br>Solve(?g,?t) ⇐ NEW(?c), ON(?c, Solve(?g, ?t))<br>Tactic(?g,?t) ⇐ READ (TACTIC(?G, ?T)), MATCH(?g, ?G), MATCH(?T,?t)<br>Tactic(?g,??t) ⇐ NO(YES ())<br>Memo(?x,?y) ⇐ OR(FIRST(READ(?y)), AND(?x, PUT(?y))) |
| meta<br>find - first<br>find - all<br>meta(?)<br>solve(?,?)<br>memoize(?x,?t)<br>euler(?)<br>fix - point(?,?) | Solve(?g, meta) ⇐ Solve(?g, meta(ground))<br>Solve(?g, find - first) ⇐<br>IF - ONE(Tactic(?g, ?T), Solve(?g, ?T), Solve(?g, meta(find - first))<br>Solve (?g, find - all) ⇐<br>IF(Tactic(?g, ?T), Solve(?g, ?T), Solve(?g, meta(find - all))<br>Solve(?g, meta(?t)) ⇐ Solve(TACTIC(?g,?T), ?t), Solve(?g,?T)<br>Solve(?g, solve(?t$_1$, ?t$_2$)) ⇐ Solve(?t$_1$, ?t$_2$)<br>Solve(?g, memoize(?x, ?t)) ⇐ Memo(Solve(?g, ?t), found[?x])<br>Solve(?g, euler(?t)) ⇐ ABSTRACT(?g, ?x), Memo(Solve(?g, ?t), goal[?x])<br>Solve(?g, fix - point (?X, ?t)) ⇐<br>SUBST(?X, fix - point(?X, ?t), ?t), Solve(?g,?t) |

*FIG. 4*

METHOD AND APPARATUS FOR PROVIDING SEMANTIC DATA ARCHITECTURE

BACKGROUND

This disclosure presents various embodiments of a semantic data architecture that uses a compact formalism that supports operation of semantic reasoners (i.e., inference engines). The semantic data architecture allows semantic reasoners to be defined. The semantic data architecture also supports customizing of semantic reasoners. In one embodiment, the semantic data architecture is based on an incremental extension of eight functional layers. Each subsequent functional layer can use or extend the previous functional layer(s).

Description logic oriented reasoners, such as the HermiT OWL Reasoner (see <http://hermit-reasoner.com>) and the Pellet OWL 2 Reasoner for (see <http://clarkparsia.com/pellet>), use (hyper)tableau calculus to perform various inference tasks on OWL2, using its direct semantics, while offering an application program interface (API), but less than desirable possibilities for configuring the algorithms. The Jena Apache Environnment, for example, offers a flexible environment that allows combining forward and backward inference engines, but does not provide enough expressiveness to specify the many tactics required to handle the variety of profiles and to tune performance to the specific needs of the application. For additional information on the Jena Apache Environment, see Apache Jena—Reasoners and Rule Engines: Jena Inference Support, The Apache Software Foundation, Copyright 2011-2013.

INCORPORATION BY REFERENCE

The following documents are fully incorporated herein by reference: 1) Wielemaker et al., Prolog-based infrastructure for RDF: performance and scalability, The Semantic Web—ISWC 2003, Proceedings of the Second International Semantic Web Conference, Sanibel Island, Fla., USA, Oct. 20-23, 2003, pp. 644-658; 2) Wielemaker et al., Using Prolog as the fundament for applications on the semantic web, Proceedings of ALPSWS 2007, 2007, pp. 84-98; 3) Cali et al., A General Datalog-Based Framework for Tractable Query Answering over Ontologies, Web Semantics: Science, Services and Agents on the World Wide Web, North America, Apr. 14, 2012, 79 pages; 4) Reasoners and rule engines: Jena inference support. Apache Jena Documentation, The Apache Software Foundation, Copyright 2011-2013, printed from http://jena.apache.org/documentation/inference/on Nov. 25, 2013, 33 pages; 5) Definite Clause Grammar, Wikipedia, last modified 17 Sep. 2013, printed from http://en.wikipedia.org/wiki/Definite_clause_grammar on Nov. 27, 2013, 7 pages; 6) OWL 2 RL in RIF (Second Edition), W3C Working Group Note, 5 Feb. 2013, 128 pages; 7) OWL 2 Web Ontology Language Profiles (Second Edition), W3C Recommendation, 11 Dec. 2012, 43 pages; 8) Signore, Representing Knowledge in the Semantic Web, World Wide Web Consortium (W3C), Milano, Italy, Jun. 29, 2005, printed from www.w3c.it/talks/2005/openCulture/on Mar. 13, 2014, 29 pages; 9) Gerber et al., A Functional Semantic Web Architecture, ESWC 2008, Proceedings of the $5^{th}$ European Semantic Web Conference, 2008, pp. 273-287; 10) Gerber et al., Towards a Semantic Web Layered Architecture, SE 2007, Proceedings of the $25^{th}$ Conference on IASTED 2007, pp. 353-362; 11) Gerber, Towards a Comprehensive Functional Layered Architecture for the Semantic Web, Chapter 7—Towards a Comprehensive and Functional Layered Architecture for the Semantic Web, Doctor's Thesis in Computer Science, University of South Africa, November 2006, pp. 177-216; 12) RDF 1.1 Primer, W3C Working Group Note, 25 Feb. 2014, 14 pages; and 13) RDF 1.1 Concepts and Abstract Syntax, W3C Recommendation, 25 Feb. 2014, 23 pages.

BRIEF DESCRIPTION

In one aspect, a method of providing a semantic data architecture is provided. In one embodiment, the method includes: providing a data model layer in the semantic data architecture, wherein the data model layer is formed by at least one processor, at least one storage device, at least one memory, and at least one communication interface in combination with a data model application program stored in the at least one storage device, wherein the at least one processor, in conjunction with running the data model application program, is configured to use the at least one storage device, the at least one memory, and the at least one communication interface to selectively receive source data from a source device, process the corresponding source data based at least in part on pre-defined data types and filtering terms to form semantic data arranged in one or more binary tree structures, and store the semantic data in the at least one storage device; and providing a data filtering layer in the semantic data architecture, wherein the data filtering layer is formed by the at least one processor, the at least one storage device, the at least one memory, and the at least one communication interface in combination with a data filtering application program stored in the at least one storage device, wherein the at least one processor, in conjunction running the data filtering application program, is configured to use the at least one storage device, the at least one memory, and the at least one communication interface to selectively receive at least a portion of the semantic data from the data model layer, process the corresponding semantic data using a reflexive matching operation based at least in part on the filtering terms to filter data through substitution to form filtered data, and store the filtered data in the at least one storage device.

In another aspect, an apparatus for providing a semantic data architecture is provided. In one embodiment, the apparatus includes: at least one processor; at least one storage device; at least one memory; and at least one communication interface; wherein the at least one storage device is configured to store a data model application program such that the at least one processor, the at least one storage device, the at least one memory, and the at least one communication interface, in combination with the data model application program, form a data model layer in the semantic data architecture, wherein the at least one processor, in conjunction with running the data model application program, is configured to use the at least one storage device, the at least one memory, and the at least one communication interface to selectively receive source data from a source device, process the corresponding source data based at least in part on pre-defined data types and filtering terms to form semantic data arranged in one or more binary tree structures, and store the semantic data in the at least one storage device; wherein the at least one storage device is configured to store a data filtering application program such that the at least one processor, the at least one storage device, the at least one memory, and the at least one communication interface, in combination with the data filtering application program, form a data filtering layer in the semantic data architecture, wherein the at least one processor, in conjunction running the data filtering application program, is configured to use the at least one storage device, the at least one memory, and the at least one communication interface to selectively receive at least a portion of the semantic data from the data model layer, process the corresponding semantic data using a reflexive matching operation based at least in part on the filtering terms to filter data through substitution to form filtered data, and store the filtered data in the at least one storage device.

In yet another aspect, a non-transitory computer-readable medium storing program instructions that, when executed by at least one processor, cause a corresponding processor-controlled device to perform a method of providing a semantic data architecture is provided. In one embodiment, the method includes: providing a data model layer in the semantic data architecture, wherein the data model layer is formed by at least one processor, at least one storage device, at least one memory, and at least one communication interface in combination with a data model application program stored in the at least one storage device, wherein the at least one processor, in conjunction with running the data model application program, is configured to use the at least one storage device, the at least one memory, and the at least one communication interface to selectively receive source data from a source device, process the corresponding source data based at least in part on pre-defined data types and filtering terms to form semantic data arranged in one or more binary tree structures, and store the semantic data in the at least one storage device; and providing a data filtering layer in the semantic data architecture, wherein the data filtering layer is formed by the at least one processor, the at least one storage device, the at least one memory, and the at least one communication interface in combination with a data filtering application program stored in the at least one storage device, wherein the at least one processor, in conjunction running the data filtering application program, is configured to use the at least one storage device, the at least one memory, and the at least one communication interface to selectively receive at least a portion of the semantic data from the data model layer, process the corresponding semantic data using a reflexive matching operation based at least in part on the filtering terms to filter data through substitution to form filtered data, and store the filtered data in the at least one storage device.

BRIEF DESCRIPTION OF THE DRAWINGS

FIG. 1 is a tabular view of exemplary matching results for various filters associated with an exemplary embodiment of a data filtering layer in a semantic data architecture;

FIG. 2 is a tabular view of exemplary substitution results for several filters associated with another exemplary embodiment of a data filtering layer in a semantic data architecture;

FIG. 3 is a tabular view of exemplary primitives associated with an exemplary embodiment of a primitive functions layer in a semantic data architecture;

FIG. 4 is a tabular view of exemplary tactics associated with an exemplary embodiment of a reasoning engine layer in a semantic data architecture;

DETAILED DESCRIPTION

Figure 5:
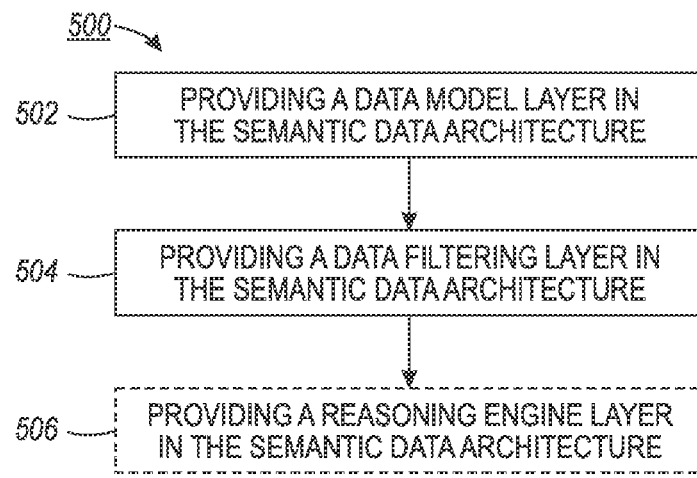
FIG. 5 is a flowchart of an exemplary embodiment of a process for providing a semantic data architecture.

This disclosure presents various embodiments of a semantic data architecture that uses a compact formalism that supports operation of semantic reasoners (i.e., inference engines). The semantic data architecture allows semantic reasoners to be defined. The semantic data architecture also supports customizing of semantic reasoners. The semantic data architecture is based on an incremental extension of eight functional layers. Each subsequent functional layer can use or extend the previous functional layer(s).

The lower functional layers of the semantic data architecture provide a data model that permits terms to be modeled using binary trees, filtering terms, and pre-defined data types (e.g., naturals, strings, URIs, symbols). An exemplary function of the data model provides a reflexive matching operation that allows selection and filtering of terms through substitution. The matching operation, being reflexive, permits the semantic data architecture to be highly expressive as well as compact.

The higher functional layers of the semantic data architecture provide a reasoning engine that is based on tactics. A set of primitive tactics for the reasoning engine allows users to design applications with a specific strategy for the reasoning engine by combining tactics to meet a customized need.

A given community of users with access to the formalized, layered semantic data architecture can configure customized reasoning engines. Users are not able to customize existing black/grey-box reasoning engines in this manner. Regarding preservation, the semantic data architecture can ease the preservation of knowledge and associated reasoning engines through a formalized and compact language. More detailed definitions and exemplary operations, usages, and applications of the functional layers and the overall semantic data architecture are provided below.

The semantic data architecture is reflexive and offers high expressiveness to define standard or a la carte reasoners and transformation engines. The semantic data architecture minimizes external dependencies and provides infrastructure compactness deserving sustainable applicative designs. The compactness is due to an approach that uses unification, enabling software to expose its internal functionalities to dynamic evolution, reuse, and self-modification. Applications based on the semantic data architecture may handle Resource Description Framework (RDF)/Web Ontology Language (OWL) data and ontologies as well as other semantized data models, while addressing data scalability issues through a streaming oriented computational model.

The semantic data architecture targets applications using semantic models, such as RDF and OWL, to handle data and knowledge while focusing on sustainable interoperability. For additional information on RDF, see the World Wide Web Consortium (W3C) specifications regarding RDF available from the W3C web site. For example, RDF 1.1 Primer, W3C Working Group Note, 25 Feb. 2014, 14 pages and RDF 1.1 Concepts and Abstract Syntax, W3C Recommendation, 25 Feb. 2014, 23 pages. For additional information on OWL, see the World Wide Web Consortium (W3C) specifications regarding OWL available from the W3C web site. For example, OWL 2 RL in RIF (Second Edition), W3C Working Group Note, 5 Feb. 2013, 128 pages and OWL 2 Web Ontology Language Profiles (Second Edition), W3C Recommendation, 11 Dec. 2012, 43 pages. The W3C main office is at the Massachusetts Institute of Technology (MIT) Computer Science and Artificial Intelligence Laboratory (CSAIL), Cambridge, Mass. The W3C RDF and OWL specifications are fully incorporated herein by reference. Broad interoperability requires expressiveness and flexibility in specifying transformations. Sustainability requires specific qualities, such as compactness of infrastructure, independance with respect to external software packages, and trustable, simple code to ease migration and portability. These properties seem contradictory at a first glance because broad expressiveness leads to either and infrastructure size and complexity increases or to adding strong dependencies to third parties packages. For example, reasoning modules may embed highly specialized algorithms based on sharp optimizations and, therefore, may behave like software blackboxes from the engineering point of view.

The semantic data architecture is organized as tiered modules of increasing functional complexity while minimizing added concepts, which is achieved through smart combination of the lower level functionalities. The first layer defines a fundamental data model. The second layer offers various (reflexive) filtering mechanisms and filter manipulation functions. The third layer defines a content-addressable memory model. The forth layer offers extensible tokenizing and parsing functions. The fifth layer defines a built-in backward reasoning (i.e., inference) engine. The sixth layer offers a core set of primitive functions. The seventh layer offers term rewriting related functions. The last level proposes combining lower level functionalities into a tactic-driven high level reasoner.

The semantic data architecture can implement various OWL profiles. For additional information on OWL profiles, see OWL 2 Web Ontology Language Profiles (Second Edition), W3C Recommendation, 11 Dec. 2012, and OWL 2 RL in RIF (Second Edition), W3C Working Group Note, 5 Feb. 2013. The semantic data architecture design provides a flexible and sustainable infrastructure through powerful abstractions.

Layers and Internal Organization

Data Model Layer

The first layer provides a data model that relies on a simple, binary tree data structure. This is similar to the data modeling approach involved in language construction using the LISt Processing (LISP) computer programming language. LISP is known for its compactness based on the list data model. However, the binary tree data model goes a step further toward radicality. The binary tree data model is used to dramatically simplify the fundamental algorithms required for implementing the semantic data architecture. In particular, the filtering algorithms, without sacrificing the expressiveness (indeed, any n-ary tree can be encoded using binary trees). Another point is that, like LISP, the binary tree data model is the basis of a homoiconic language. Such a language is able to represent its own constructs as terms, and therefore, is able to check, interpret, and compile itself.

Definition 1. The expression below reflects a basic term (t) defined as a binary tree with values of various type (v) and filtering (f) terms.

$$t::= ``(``tt")" | v | f$$

$$v \in \{naturals\} \cup \{strings\} \cup \{URIs\} \cup \{symbols\}$$

Leaves of binary trees are values of primitive types (e.g., naturals, strings, uniform resource identifiers (URIs), or symbols) or filters having a specific lexical structure detailed hereafter. The following list provides some examples of filters that are terms belonging to L.

(a(12))

(a(?2))

(b((c(12))?x))

(b((c(??x?))??))(b((c(??))??:nat))

Leaves of the binary trees capture various values for primitive types (e.g., naturals, strings, symbols) that have an expected standard lexical structure (e.g., 12, "str", john, rdf: type) and terminal filters. Terminal filters are prefixed with the symbol ?. The lexical structure for terminal filtering terms is detailed below in Definition 2. In subsequent examples, ?" to denote $?_1 \ldots ?_n$. "Filters" are distinguished from "terminal filters" in that the latter is built via Definition 2 (see below) and, by construction, can appear as a leaf in a binary tree. The former (i.e., filters) designate binary trees, which may contain terminal filters, are used as a pattern to perform a filtering operation (e.g., see FIGS. 3 and 4).

Definition 2. The expression below reflects a filtering term (f) defined as a lexical structure.

$$f::=?f|?|?\alpha.\tau|?.\tau$$

$$\tau::=nat|symb|string|uri$$

Mapping variables are intended to capture the filtered term using a substitution that is explained in more detail below in the formal definition of the second layer (i.e., filtering functions). The binary tree data model is primitive and poorly adapted to programming. However, the formal definition of the fourth layer (e.g., parsing functions) include a few added constructs to handle more expressive data structures as syntactic sugar. This means that more sophisticated terms can be homogeneously handled as binary trees. For example, several more sophisticated terms are provided below:

Add[1,z]≡(@2(Add(1(znil))))

Add(1,2,3)≡(@1(Add(1(2(3nil)))))

Using this approach, a programmer can write Add[1, z] rather than (@2 (Add (1 (z nil)))). This enables the programmer to focus on other, more cental issues of a given program.

Data Filtering Layer

The second layer provides filtering functions by providing a filtering mechanism and filtering algorithms. For example, reflexive asymmetric matching algorithms, reflexive symmetric matching algorithms, and other filter manipulation algorithms may be provided in various combinations. Logic based computer programming languages, pioneered by the Prolog general purpose logic programming language, offered a significant step forward in building knowledge aware applications, mainly due to the relevance and efficiency of unification algorithms. Today, Datalog and other logic based languages inspired by Prolog are back on the stage because of the expressive power offered by unification and their ability to elegantly model vast amounts of data. Datalog is a declarative logic programming language that is related to Prolog, but more oriented toward data. However, the underlying logic for today's logic based languages is based on the Herbrand resolution principle and is not well adapted to handle, in a simple way, sophisticated knowledge models of today that are based on OWL ontologies. Additionally, today's logic based languages are not well adapted to handle W3C knowledge models which relies on the so-called "open world hypothesis" that information not present in the knowledge base is considered as "unknown" instead of "false." For additional information on Prolog, see Wielmaker et al., Prolog-based Infrastructure for RDF: Scalability and Performance, Proceedings of the Second Annual Semantic Web Conference, Lecture Notes in Computer Science, Vol. 2870, 2003, pp. 644-658, and Wielmaker et al., Using Prolog as the Fundament for Applications on the Semantic Web, Proceedings of the Workshop on Applications of Logic Programming to the Web, Semantic Web and Semantic Web Services, Vol. 287, pp. 1-16. For additional information on Datalog, see Cali et al., A General Datalog-based Framework for Tractable Query Answering over Ontologies, Web Semantics: Science, Services and Agents on the World Wide Web, Vol. 14, July 2012, pp. 57-83.

The filtering layer provides algorithms to refine the idea underlying unification toward more discriminative operations. This increases the expressive power of data filtering and, in particular, considers filters as first order objects that can be filtered by other filters. This property (i.e., reflexive filtering) opens the door to reflexive semantic data architectures that are able to model themselves and raise internal reuse to higher levels.

Asymmetric Matching

The filtering terms associated with terms in the binary tree data structure provide a way to extract information from a given term through a match function. If the match is successful, a substitution is returned. The general property of the matching function is that, if successful, the resulting substitution, when applied to the filter, returns a term equal to the subject. In the Property 1 definition below ≡ is the identity relation, whereas = involves computation. To be generally true, this property is expressed modulo a normalizing function—$\hat{t}$—transforming unlabelled variables in t into variables with independant fresh names.

Property 1. The expression below reflects an asymmetric matching function for all terms t, t' and substitution $\Phi$.

$$\text{match}(t, \hat{t'}) = \Phi \Rightarrow \Phi(\hat{t'}) \equiv t$$

With reference to FIG. 1, a tabular view of exemplary matching results for various filters associated with an exemplary embodiment of a data filtering layer in a semantic data architecture is provided. The table in FIG. 1 shows the matching results for various filters that are applied to an exemplary subject, which is Add[1, Mul[1, z]].

Definition 3. The table below provides examples of asymmetric matching expressions (Expressions 1-9) in which (x, y) are symbols and n a positive integer.

$$\text{match}(v,v) = \{\} \tag{1}$$

$$\text{match}(v, ?:\tau) = \{\} \text{ if } v \in \tau \tag{2}$$

$$\text{match}(v, ?x:\tau) = \{?x:\tau \mapsto t\} \text{ if } v \text{ has type } \tau \tag{3}$$

$$\text{match}(t, ?x) = \{?x \mapsto t\} \tag{4}$$

$$\text{match}(t, ?) = \{\} \tag{5}$$

$$\text{match}((t_1 t_2),(t'_1 t'_2)) = \phi_1 \cup \phi_2$$
$$\text{if match}(t_1, t'_1) = \phi_1 \wedge \text{match}(\phi_1(t_2), t'_2) = \phi_2 \tag{6}$$

$$\text{match}(f, ?^{(n+1)}x) = \{?^{(n+1)}x \mapsto f\} \text{ if } f \in \{?^n\_y, ?^n, ?^n\_y:\tau, ?^n:\tau\} \text{ for some variable } y \tag{7}$$

$$\text{match}(?^n y:\tau, ?^{(n+1)}x:\tau) = \{?^{(n+1)}x:\tau \mapsto ?^n y:\tau\} \tag{8}$$

$$\text{match}(f, ?^{(n+1)}) = \{\} \text{ if } f \in \{?^n y, ?^n, ?^n y:\tau, ?^n:T\} \text{ for some variable } y \tag{9}$$

With reference to FIG. 2, a tabular view of exemplary substitution results for several filters associated with another exemplary embodiment of a data filtering layer in a semantic data architecture is provided. The discriminative nature of the matching function is expressed in Expressions 1-3 and achieved through filters, such as ?x:τ, that convey typing information. Reflexivity is achieved through Expressions 7-9. As an illustration, the filter Add[?x,Mul[?x,z]], which was previously used in the table above related to Property 1, can be itself filtered in various ways. This is shown in the table of FIG. 2. Note that the second example in the table of FIG. 2 is more discriminative than the first example. For example, the first example returns Add[1,Mul[2,z]] as a match, but the second example does not.

Symmetric Matching

A symmetric matching function (e.g., revisiting unification) extends the expressiveness of the semantic data architecture. The standard unification algorithm builds on the structural analogy between the two involved terms, regardless of the operands order. For example, in the matching algorithm, this is the structure of the second parameter, the pattern, which drives the identification process. For instance, in Prolog, Add(X,3) will be unified with Add(1,Y), yielding $\{X \mapsto 1, Y \mapsto 3\}$. However, in Prolog, X and Y are meta variables and do not belong to the underlying term language. The symmetric matching function provides a similar approach while preserving the essential properties involved in the matching algorithm.

Definition 4. The table below provides exemplary symmetric matching expressions (Expressions 10-11) in which Smatch specifices the symmetric matching function, α denotes atoms (i.e values or variables associated with the symmetric matching function).

$$\text{Smatch}(\alpha_1, \alpha_2) = \phi$$

if match$(\alpha_1, \alpha_2) = \phi$ or otherwise, $$\text{if match}(\alpha_2, \alpha_1) = \phi \tag{10}$$

$$\text{Smatch}((t_1 t_2),(t'_1 t'_2)) = \phi_1 \cup \phi_2$$

if Smatch$(t_1, t'_1) = \phi_1 \wedge$ $$\text{Smatch}(\phi_1(t_2), \phi_1(t'_2)) = \phi_2 \tag{11}$$

Note that despite being symmetric in the sense described above, the Smatch function may be sensitive to the order of the operands. For example, a change in the order of the operands in the expressions below provides different results.

$$\text{Smatch}(\text{Add}(?x,2),\text{Add}(??y,?z)) = \{? \mapsto 2, ??y \mapsto ?x\}$$

$$\text{Smatch}(\text{Add}(??y,?z),\text{Add}(?x,2)) = \{?z \mapsto 2, ?x \mapsto ??y\}$$

The symmetric matching function may be described as shown in Property 2.

Property 2. The expression below reflects a symmetric matching function for all terms $\hat{t}_1, \hat{t}_2$ and substitution $\Phi$.

$$\text{Smatch}(\hat{t}_1, \hat{t}_2) = \Phi \Rightarrow \Phi(\hat{t}_1) \equiv \Phi(\hat{t}_2)$$

Memory Model Layer

The third layer provides a memory model that includes an execution context as an ordered stack (a list) of data stores, and a process for data store management. The data stores are ordered multisets (i.e., sequences) of data that can be modified after placement on the top of the context stack. The execution context offers global access to the data through a read(t) function that uses a pattern t to filter out stores in order. Therefore, the memory model is a segmented content access memory (i.e., an associative memory) that offers a powerful, simple way to access data while also providing a straight forward protection mechanism.

The first data store in the stack is called the kernel (K) and includes language primitives defined by the primitives function of the sixth layer. Data stores are created through a new function that returns an opaque reference to a list S which is manipulated as an fresh symbol as. The data stores are pushed or selected through the on and in functions. The data stores are written and deleted through the put and get functions.

The definitions of the on, in, put, and get functions make use of an abstract eval function that accepts a context stack and a term in input and yields a stream of (context stack, substitution) pair, when successful. The execution context for the memory model is inspired from a generator mechanism of Python, a general purpose high-level programming language.

For example, see Python 2.7.5 Language Reference, July 2013. The Python generator mechanism permits sequential execution of parallel programs using a sequential and concurrent execution context for the memory model.

Definition 5. The table below provides exemplary eval expressions (Expressions 12-17) for data store access and manipulation primitives.

| | | |
|---|---|---|
| $eval(C, new(f))$ = | yield $(C, \{f \mapsto \alpha^S\})$ if $match(f, ??:symb)$ and $S = nil$ | (12) |
| $eval(C, on(\alpha^S, t))$ = | for $cc, \Phi \in eval((S\ C), t)$ {yield $(C, \Phi)$} | (13) |
| $eval(C, in(\alpha^S, t))$ = | for $cc, \Phi \in eval((S\ K), t)$ {yield $(C, \Phi)$} | (14) |
| $eval((S\ C), put(t))$ = | yield $(((t\ S)\ C), \emptyset)$ | (15) |
| $eval((S\ C), read(t))$ = | if $C \neq \emptyset$ { for $cc, \Phi \in eval(C,t)$ { yield$((S\ C), \Phi)$ } } for $t_i \in reverse(S)$ { if $match(t_i,t) = \Phi$ { yield$((S\ C), \Phi)$ } } | (16) |
| $eval((S\ C), get(t))$ = | for $t_i \in reverse(S)$ { if $match(t\_i,t)=\Phi$ {yield$((del(i,S)\ C), \Phi)$} } | (17) |

General Purpose Parser Layer

The fourth layer provides parsing functions through a dynamic, general purpose parser. A primitive data model is poorly adapted to human perception and cognitive skills. This is one major reason why languages like LISP are not widely used today. Primitive data models alone create an even worse problem in view of the complex expressions required to represent today's data models. For example, using a binary tree model alone it is almost impossible to design real world programs. However, the simplicity of data in a binary tree form can be compensated by parsing complex expressions. For example, a parsing mechanism can be used to abstract over the complex expression phenomenon of a binary tree model. This can free the programmer from the burden of dealing with such complex expressions. For exmaple, it is simpler for a programmer to write Add[1,z], than (@2 (Add (1 z))). Thus, substition of Add[1,z] for (@2 (Add (1 z))) can allow the programmer to focus on more central issues of a given program. This issue, namely, adapting the syntax and tuning the conceptual programming abstractions to the users/programmers skills is a fundamental issue, and usually not explicitly addressed by computer language theorists. Therefore, the parsing function layer of the semantic data architecture relies on a general purpose parser that is able to dynamically extend the language it recognizes and produces parsing results as trees that conform to the binary trees presented above for the data model (first layer).

A language extension provided in the parsing functions is detailed by the grammar depicted below in Definition 6. Two new categories of terms are added with the parsing functions. Namely, functional call notation and the relational data structure notation are the new categories. The new categories are suited to most programmers as a way to distinguish between what is active (i.e., executed) and that which is passive (i.e., objects of operations). However, this distinction is purely arbitrary in the semantic data architecture.

Definition 6. The expressions below provide terms (t) and a language (L) defined using certain exemplary terms.

$$t ::= t\ "["L"]"\ |\ t"("L")"$$

$$L ::= t\ ","L$$

$$L ::= t\ "|"\ t$$

$$L ::= t$$

$$L ::=$$

The expressions below provide examples of terms associated with an exemplary binary tree representation after syntactic sugar expansion. The vertical bar (|) notation in the second example borrows from Prolog's list notation.

$$Add[1,z] \equiv (@2(Add(1(znil))))$$

$$Add(1,z\,|\,?x) \equiv (@1(Add(1(z\,?x))))$$

The syntactic sugars involve two dedicated symbols: @1 and @2 (read "apply 1" and "apply 2"). To extend the expressiveness of the language, the parser can interpret dedicated terms capturing the meaning of syntactic rules. The parser is based on a variant of a a definite clause grammer (DCG) parser regarding the grammar rule structure, but uses a more general bottom-up parsing algorithm that allows he recognition of any context-free language. The DCG grammar rules provide a way for expressing grammar for natural or formal languages in a programming language, such as Prolog. Instead of using standard unification, the parsing functions use the matching algorithms described in the second layer (i.e., filtering functions) and may explicitly invoke a backward reasoning engine during the parsing phase (when a rule is reduced) to enable context sensitive recognition. The backward reasoning engines is presented below in the discussion of the fifth layer of the semantic data architecture. The reflexivity of the filtering algorithms allow the parser is able to recognize languages as they are dynamically modified. The syntax rule understood by the parser looks like LHS::= $RHS_1, \ldots, RHS_n/action_1, \ldots$/under its high level representation. As a more concrete illustration of the syntax rule, the definition in the example below is a reflexive definition of the syntactic extension previously defined in Definition 6.

$$T((@2(?x?y))) ::= T(?x),\backslash[,L(?y),\backslash]//$$

$$T((@1(?x?y))) ::= T(?x),\backslash(,L(?y),\backslash)//$$

$$L((?x?y)) ::= T(?x),\backslash,L(?y)//$$

$$L((?xnil)) ::= T(?x)//$$

$$L(nil) ::= //$$

Syntactic rules handled by the dynamic parser, under their binary tree form, are in the form (STX (rule action)) with rule being a list from left to right of items. As an example, the last grammar rule from the example above is translated in the syntactic rules provided in the expressions below:

$$parse("L(nil)\ ::=\ //") = parse("(STX((L(nil)nil)nil))")$$

$$= (STX(((@1(L(nil\ nil)))nil)nil))$$

Note that, under the syntactic rules, lists of terms a, b, c are captured by (a (b (c nil))), and a, b|c is captured by (a (b c)) where the symbol nil denotes the tail of the list. Due to the reflexive nature of the semantic data architecture, the syntactic rules needed to capture the syntax of rules can be defined using the expression below:

$$T((STX((?lhs?rhs)?a)))::=T(?lhs),\backslash::=,L(?rhs),\backslash/,$$
$$L(?a),\backslash///$$

Backward Inference Layer

The fifth layer provides a backward chaining reasoner (i.e., backward reasoning engine; backward inference) that uses specific rules having a general form of ($\Leftarrow$(goal, conditions)). The backward reasoner rules are typically built from the syntax extension presented below in Definition 7.

Definition 7. The expression below provides exemplary clauses that form a rule for a backward chaining reasoner.

$$T((\Leftarrow(?x?y)))::=T(?x),\Leftarrow,L(?y)//$$

The inference process includes reading all backward chaining rules in the context and applying a symmetric matching between the current target and the left hand side of the rule. If successful, the inference process is reiterated to each condition of the right hand side, after instanciating the variables. In other words, the inference process applies the substitution to all conditions.

Note that the evaluation of the condition is a product. Each result yielded by condition i leads to evaluate condition i+1. According to this model, since all matching rules are evaluated, and all solutions are explored, this is a greedy exploration strategy. However, rules are applied according to memory order. Some language primitives can be used explicitly to drive the search, to cut the search tree, or to fetch/store information in memory. For example, see the language primitives (e.g., FIRST, AND, OR, NO, IF, etc.) described below in the discussion of the sixth layer of the semantic data architecture. Potential context modifications are propagated during the development of the search tree in conjunction with operation of the backward reasoning engine. Additionally, the backward reasoning rules are refreshed before symmetric matching to avoid any name conflicts.

Definition 8. The table below provides examplary expressions (Expressions 18-21) in conjunction with forming a backward chaining inference (i.e., reasoning) engine.

will be addressed through tactics (e.g., see FIG. 4 and its description below).

Primitive Functions Layer

The sixth layer provides primitive functions through definitions of certain language primitives. The primitive functions define goals that are directly handled by the kernel. By convention, uppercase letters are used to name the language primitives.

With reference to FIG. 3, a tabular view of exemplary primitives associated with an exemplary embodiment of a primitive functions layer in a semantic data architecture is provided. Several exemplary language primitives are identified in the table of FIG. 3. Thee exemplary langugage primitives can be classified in three groups: 1) store and context access and manipulation, 2) matching and refreshing, and 3) stream aware logical operations.

Rewriting Engine Layer

The seventh layer provides term rewriting functions through a mechanism for rewriting terms. The mechanism to rewrite terms is based on specific backward chaining rules, such as the rule defined by the expression below:

$$(\Leftarrow((\rightarrow(tt'))conditions))\sim(t\rightarrow t')\Leftarrow conditions$$

The expression above transforms the term t into t' after determining the conditions are satisfied. The term rewriting function is directly based on the backward inference, and therefore, sensitive to rule order in memory. Term rewriting expressions may yield several results depending on the geometry of rules and conditions.

Definition 9. Expression 22 provides an exemplary expression of term rewriting and associated computations.

$$x:=refresh(?x)$$

$$eval(C,rewrite(t))=s:=(\rightarrow(tx))$$

$$for(c,\phi)\in eval(C,infer(s))\{yield(c,\phi(x))\} \qquad (22)$$

The term rewriting function associated with Expression 22 is available through the corresponding language primitive (i.e., REWRITE of arity 2). For example, the REWRITE primitive used in the expression below allows the definition of

| | | | |
|---|---|---|---|
| eval(C,infer(t)) | = | (s:=$\Leftarrow$(?goal ?cond))<br>for (c, $\phi$) $\in$ eval(C, read-fresh(s)) {<br>  if Smatch(t, $\phi$(?goal)) = $\Phi$ {<br>    for (c$_2$, $\phi$') $\in$ eval(c, inferL($\Phi$($\phi$(?cond))) {<br>      yield(c$_2$, $\Phi$ $\cup$ $\phi$')<br>    }<br>  }<br>}) | (18) |
| eval(C, inferL((t$_1$ t$_2$)) | = | for (c$_1$,$\phi_1$) $\in$ eval(C, infer(t$_1$)){<br>  for (c$_2$, $\phi_2$) $\in$ eval(c$_1$, inferL($\phi_1$ (t$_2$)))<br>  {yield(c$_2$,$\phi_1$ $\cup$ $\phi_2$)}<br>} | (19) |
| eval(C, inferL(nil)) | = | yield(C, $\emptyset$) | (20) |
| eval(C, read-fresh(t)) | = | (for (c, $\phi$) $\in$ eval(C, read(t)){<br>  If match(refresh($\phi$(t)),t) = $\Phi$ {yield(c, $\Phi$)}<br>}) | (21) |

The inferencing mechanism (i.e., backward reasoning engine) is powerful and open, allowing context modifications during the search tree deployement. The inference mechanism also allows introduction of new rules during the deployment. When working on transitive relations, the basic inference mechanism as presented here typically makes the development of an infinite search tree highly probable, which a general purpose computing mechanism which performs all possible transformations and stops when no rewriting rule can be applied.

$$eval(C,REWRITE(t,t'))=for(c,t_2)\in eval(C,rewrite(t))\{if$$
$$match(t_2,t')=\phi\{yield(C,\phi)\}\}$$

Definition 10 below provides exemplary general purpose computing mechanism using the REWRITE primitive.

Definition 10. The expressions below provide exemplary non-deterministic (reflexive) transitive computing mechanisms.

Compute(X,Y) ⇐ REWRITE(X,X'),RCompute(X',Y)

RCompute(X,Y) ⇐ OR(Compute(X,Y),MATCH(X,Y))

The term rewriting functions, computing mechanisms, and resulting computations allow a straight forward implementation of a primitive interpreter and a loader.

Interpreter(?stx) ⇐ INPUT(">",?x),

PARSE(?stx,?x,?y),

RCompute(?y,?z),

DISPLAY(?z)

Interpreter(?stx)

Loader(?path:uri) ⇐ PARSE(?path:uri,?x),

RCompute(?x, ?y),

PUT(?y)

Reasoning Engine Layer

The eighth layer provides configurable reasoning engine that is based on the other seven layers. The configurable reasoning engine includes a higher level reasoning engine that is based on tactics. The configurable reasoning engine is built on a dedicated predicate Solve of arity 2. The first operand in the Solve predicate is a goal, whereas the second operand is a tactic. A solver algorithm operates using the Solve predicate after pushing a new store in the context. Under these circumstances, changes can be performed in the context of the reasoning process, and those changes are confied to this operation as they cannot be applied to the other stores of the global context. A collection of backward rules defines the semantics of base tactics, on which the users will be able to combine to achieve efficient and powerful strategies. It is understood that the eighth layer can also implement other types of applications and/or engines in addition to the reasoning engine. Such other types of applications and/or engines could be based on other strategies that address other perceived problems that may be different from reasoning stratgies or may be combined with reasoning strategies.

With reference to FIG. 4, a tabular view of exemplary tactics associated with an exemplary embodiment of a reasoning engine layer in a semantic data architecture. The table of FIG. 4 lists a few exemplary tactics and corresponding definitions to illustrate a few strategies available throught the configurable reasoning engine.

The exemplary meta tactics are especially powerful. For example, to solve a given goal g, one must solve a meta goal, i.e. infer a term TACTIC(g,t) which will provide potentially a stream of tactic t to try in order to find solutions. Regarding RDF schema (RDFS) inferencing, one can illustrate the benefit of using those tactics through use cases. In one exemplary use case, the intention is to compute the extension set (that is, all instances) of a specific given class, captured by ?y: uri. Note, the discriminative typing in this use case insures that the class is known when the tactic is selected. The exemplary expressions below define the TACTIC for this exemplary use case.

```
TACTIC(
    Triple(? ? x, rdf: type, ? y: uri),
    fix - point(A,
        disjoint - union(
            ground,
            and(
                solve(Triple(? z: uri, rdf: subClassOf, ? y: uri), ground),
                solve(Triple(? ? x, rdf: type, ? z: uri), A),
            )
        )
    )
)
```

In the current context, the above exemplary TACTIC will allow an efficient implementation of an RDF subsumption, provided the store is normalized. That is, all Triple(?, rdf: subClassOf,?) are made explicit in the memory, for instance, by a forward chaining mechanism.

With reference to FIG. 5, an exemplary embodiment of a process 500 for providing a semantic data architecture begins at 502 a data model layer in the semantic data architecture is provided. The data model layer is formed by at least one processor, at least one storage device, at least one memory, and at least one communication interface in combination with a data model application program stored in the at least one storage device. The at least one processor, in conjunction with running the data model application program, is configured to use the at least one storage device, the at least one memory, and the at least one communication interface to i) selectively receive source data from a source device, ii) process the corresponding source data based at least in part on pre-defined data types and filtering terms to form semantic data arranged in one or more binary tree structures, and iii) store the semantic data in the at least one storage device. The data model layer may be provided on one or more computer platforms. The one or more computer platforms providing the data model layer may include a server computer platform, a client computer platform, and a standalone computer platform in any suitable combination.

At 504, a data filtering layer in the semantic data architecture is provided. The data filtering layer is formed by the at least one processor, the at least one storage device, the at least one memory, and the at least one communication interface in combination with a data filtering application program stored in the at least one storage device. The at least one processor, in conjunction running the data filtering application program, is configured to use the at least one storage device, the at least one memory, and the at least one communication interface to i) selectively receive at least a portion of the semantic data from the data model layer, ii) process the corresponding semantic data using a reflexive matching operation based at least in part on the filtering terms to filter data through substitution to form filtered data, and iii) store the filtered data in the at least one storage device. The data filtering layer may be provided on one or more computer platforms. The one or more computer platforms providing the data filtering layer may include a server computer platform, a client computer platform, and a standalone computer platform in any suitable combination. The one or more computer platforms providing the data filtering layer may be different computer platforms from those which provide the data model layer. Alternatively, any computer platform may provide both the data model layer and data filtering layer or portions thereof.

In another embodiment, the process 500 may also include providing a reasoning engine layer in the semantic data architecture. The reasoning engine layer is formed by the at least one processor, the at least one storage device, the at least one memory, and the at least one communication interface in combination with a reasoning engine application program stored in the at least one storage device. The at least one processor, in conjunction running the reasoning engine application program, is configured to use the at least one storage device, the at least one memory, and the at least one communication interface to i) selectively receive at least a portion of the filtered data from the data filtering layer, ii) process the corresponding filtered data based at least in part on one or more select tactics of a set of primitive tactics to form knowledge data, and iii) store the knowledge data in the at least one storage device. In a further embodiment of the process, the semantic data architecture is configured to form the knowledge data in relation to a knowledge request. The reasoning engine layer may be provided on one or more computer platforms. The one or more computer platforms providing the reasoning engine layer may include a server computer platform, a client computer platform, and a standalone computer platform in any suitable combination. The one or more computer platforms providing the reasoning engine layer may be different computer platforms from those which provide the data model layer and data filtering layer. Alternatively, any computer platform may provide the reasoning engine layer, data model layer, and data filtering layer or portions thereof in any combination.

In yet another embodiment of the process 500, the data model layer is configured to identify binary trees, data types, and terminal filtering terms using the following expression:

$$t::= ``("tt")" | v | f$$

$$v \in \{naturals\} \cup \{strings\} \cup \{URIs\} \cup \{symbols\},$$

where t represents a binary tree, v represents a value for a data type, and f represents a terminal filtering term.

In still another embodiment of the process 500, the data model layer is configured to further identify filtering terms using the following expression:

$$f ::= ?f | ? | ?\alpha.\tau | ?:\tau$$

$$\tau ::= nat | symb | string | uri,$$

where f represents a terminal filtering term, α represents a variable, and τ represents a type.

In still yet another embodiment of the process 500, the reflexive matching operation associated with the data filtering layer includes an asymmetric matching function defined below and mathematically characterized by the following expression:

$$\text{match}(t, \hat{t'}) = \Phi \Rightarrow \Phi(\hat{t'}) \equiv t,$$

where t represents a binary tree, $\hat{t'}$ represents a normalized term, and Φ represents a substitution. Normalized terms are terms in which implicit filters (e.g., ?, ?:τ), which contain no variables, are transformed to an equivalent filter with independent and fresh variables. This normalization process is a mathematical way to simplify the characterization of a matching operation, as exposed in the formula above. As an illustration, (a (?(??x))) is normalized into (a (?v₁(?v₂?x))).

In another embodiment of the process 500, the reflexive matching operation associated with the data filtering layer includes an asymmetric matching function defined by at least one of the following expressions:

$$\text{match}(v,v) = \{\},$$

$$\text{match}(v, ?:\tau) = \{\} \text{ if } v \in \tau,$$

$$\text{match}(v, ?x:\tau) = \{?x:\tau \mapsto t\} \text{ if } v \text{ has type } \tau,$$

$$\text{match}(t, ?x) = \{?x \mapsto t\},$$

$$\text{match}(t, ?) = \{\},$$

$$\text{match}((t_1 t_2), (t'_1 t'_2)) = \phi_1 \cup \phi_2$$

$$\text{if } \text{match}(t_1, t'_1) = \phi_1 \wedge \text{match}(\phi_1(t_2), t'_2) = \phi_2,$$

$$\text{match}(f, ?^{(n+1)}x) = \{?^{(n+1)}x \mapsto f\} \text{ if } f \in \{?^n y, ?^n, ?^n y:\tau, ?^n:\tau\}$$
for, some variable y $$\text{match}(?^n y:\tau, ?^{(n+1)}x:\tau) = \{?^{(n+1)}x:\tau \mapsto ?^n y:\tau\}, \text{ and}$$

$$\text{match}(f, \Rightarrow^{(n+1)}) = \{\} \text{ if } f \in \{?^n y, ?^n, ?^n y:\tau, ?^n:\tau\} \text{ for some variable } y,$$

where v represents a value of data type, T represents a type, (x, y) are symbols, t and t' represent binary trees, Φ represents a substitution, n a positive integer, and f represents a terminal filtering term.

In yet another embodiment of the process 500, the reflexive matching operation associated with the data filtering layer includes a symmetric matching function defined by at least one of the following expressions:

$$\text{Smatch}(\alpha_1, \alpha_2) = \phi \text{ if } \text{match}(\alpha_1, \alpha_2) = \phi \text{ or otherwise, if } \text{match}(\alpha_2, \alpha_1) = \phi,$$

and $$\text{Smatch}((t_1 t_2), (t'_1 t'_2)) = \phi_1 \cup \phi_2$$

$$\text{if } \text{Smatch}(t_1, t'_1) = \phi_1 \wedge \text{Smatch}(\phi_1(t_2), \phi_1(t'_2)) = \phi_2,$$

where α represents atoms, Φ represents a substitution, and t and t' binary trees.

In still another embodiment of the process 500, the reflexive matching operation associated with the data filtering layer includes a symmetric matching function defined by the above paragraph and mathematically characterized by the following expression:

$$\text{Smatch}(\hat{t}_1, \hat{t}_2) = \Phi \Rightarrow \Phi(\hat{t}_1) \equiv \Phi(\hat{t}_2)$$

where $\hat{t}_1$ and $\hat{t}_2$ represent normalized terms and Φ represents a substitution. Normalized terms are terms in which implicit filters (e.g., ?, ?: τ), which contain no variables, are transformed to an equivalent filter with independent and fresh variables. This normalization process is a mathematical way to simplify the characterization of a matching operation, as exposed in the formula above. As an illustration, (a (?(??x))) is normalized into (a (?v₁(?v₂?x))).

Figure 6:
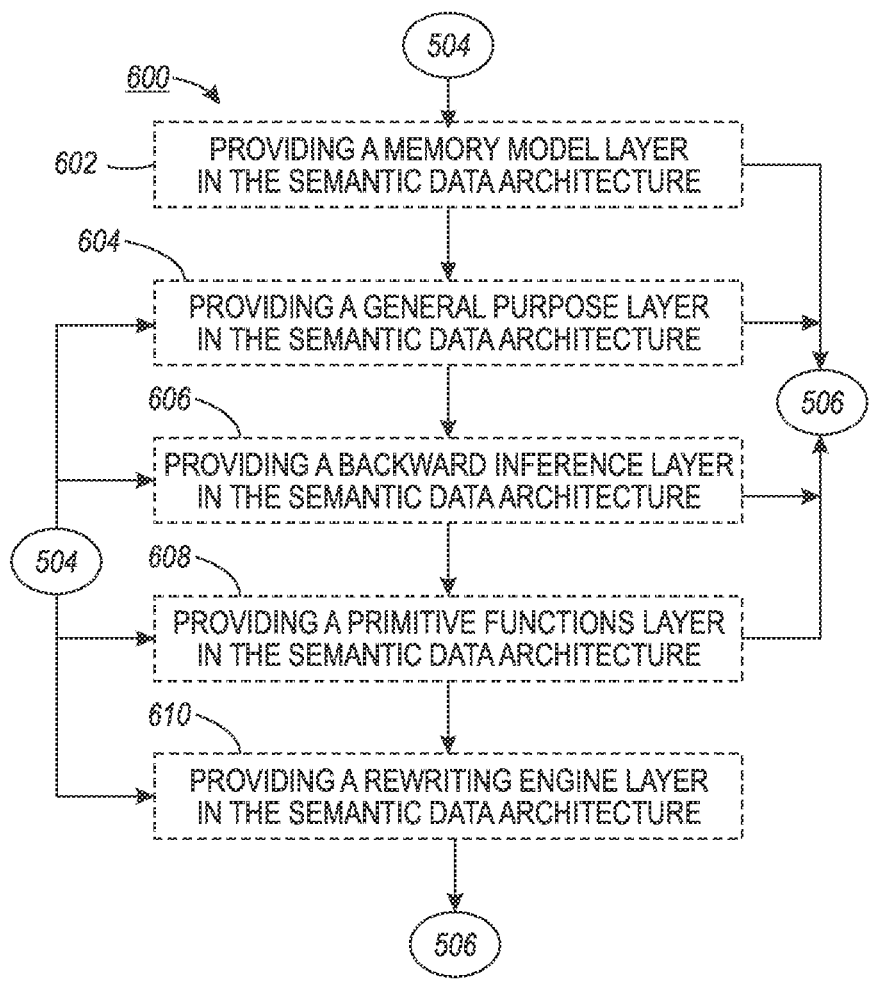
FIG. 6, in conjunction with FIG. 5, is a flowchart of various exemplary embodiments of a process for providing a semantic data architecture.

With reference to FIGS. 5 and 6, various other embodiments of a process 600 for providing a semantic data architecture include the process 500 of FIG. 5 and continue from 504 to 602, 604, 606, 608, or 610. Additionally, the various embodiment of the process 600 depict how this process may return to 506 of FIG. 5 from 602, 604, 606, 608, or 610.

In an exemplary embodiment, the process 600 continues from 504 to 602 where a memory model layer in the semantic data architecture is provided. The memory model layer is formed by the at least one processor, the at least one storage device, the at least one memory, and the at least one communication interface in combination with a memory model application program stored in the at least one storage device. The at least one processor, in conjunction running the memory model application program, is configured to use the at least one storage device, the at least one memory, and the at least one communication interface to i) selectively receive one or more of at least a portion of the semantic data from the data model layer and at least a portion of the filtered data from the data filtering layer, ii) process the corresponding semantic data and filtered data to form corresponding ordered stacks of data stores with execution contexts and associative terms for access to the data stores, and iii) store the corresponding semantic data and filtered data in an associative memory manner in the at least one storage device. In this embodiment, the process 600 may continue from 602 to 604 or return to 506 of FIG. 5. The memory model layer may be provided on one or more computer platforms. The one or more computer platforms providing the memory model layer may include a server computer platform, a client computer platform, and a standalone computer platform in any suitable combination. The one or more computer platforms providing the memory model layer may be different computer platforms from those which provide the data model layer and data filtering layer. Alternatively, any computer platform may provide the memory model layer, data model layer, and data filtering layer or portions thereof in any combination.

In a further embodiment of this process 600, the memory module layer includes an evaluation function for data store access and manipulation in conjunction with the corresponding execution context, the evaluation function defined by at least one of the following expressions:

$$eval(C, new(f)) = yield(C, \{f \mapsto \alpha^S\}),$$

if $match(f,??:symb)$ and $S=nil$ $$eval(C, on(\alpha^S, t)) = \text{for } cc, \phi \in eval((SC), t)\{yield(C, \phi)\},$$

$$eval(C, in(\alpha^S, t)) = \text{for } cc, \phi \in eval((SK), t)\{yield(C, \phi)\},$$

$$eval((SC), put(t)) = yield(((tS)C), \emptyset),$$

$$eval((SC), read(t)) = if\ C \neq \emptyset \{\text{for } cc, \phi \in eval(C, t)\{yield((SC), \phi)\}\}$$

for $t_i \in reverse(S)\{if\ match(t_i, t) = \phi\{yield((SC), \phi)\}\}$, and $$eval((SC), get(t)) = \text{for } t_i \in reverse(S)\{if\ match(t_i, t) = \phi\{yield((del(i, S)C), \phi)\}\},$$

where C represents the current stack, f represents a filtering term, $\alpha^S$ represents a particular fresh symbol, called an opaque symbol, used by the system to designate and handle stores, S represents the a-associated store, cc is an intermediary variable representing the context stack returned by the eval function, Φ represents a substitution, $t_i$ represents the terms returned from the reversed enumeration of top context S, and i represents the index of the term $t_i$ in the store S. Note that del(i,S) is an order-preserving function that returns a store similar to S, except that the term at position i is deleted.

In another exemplary embodiment, the process 600 continues from 504 to 604 where a general purpose parser layer in the semantic data architecture is provided. The general purpose parser layer is formed by the at least one processor, the at least one storage device, the at least one memory, and the at least one communication interface in combination with a general purpose parser application program stored in the at least one storage device. The at least one processor, in conjunction running the general purpose parser application program, is configured to use the at least one storage device, the at least one memory, and the at least one communication interface to selectively receive at least a portion of the filtered data from the data filtering layer, process the corresponding filtered data to i) dynamically recognize terms of a predetermined programming language based at least in part on functional call notation and relational data structure notation to produce parsing results as parsed trees conforming to the binary trees of the data model layer and ii) store the parsing results in the at least one storage device. In this embodiment, the process 600 may continue from 604 to 606 or return to 506 of FIG. 5. The general purpose parser layer may be provided on one or more computer platforms. The one or more computer platforms providing the general purpose parser layer may include a server computer platform, a client computer platform, and a standalone computer platform in any suitable combination. The one or more computer platforms providing the general purpose parser layer may be different computer platforms from those which provide the data model layer and data filtering layer. Alternatively, any computer platform may provide the general purpose parser layer, data model layer, and data filtering layer or portions thereof in any combination.

In a further embodiment of this process 600, the general purpose parser layer includes a language function identifying parsing terms, the language function defined by at least one of the following expressions:

$$t::=t\text{``}[\text{''}L\text{``}]\text{''}|t\text{``}(\text{''}L\text{``})\text{''}$$

$$L::=t\text{``},\text{''}L$$

$$L::=t\text{``}|\text{''}t$$

$$L::=t$$

$$L::=,$$

where t represents a binary tree and L represents a term, a comma-separated list of terms, or a comma-separated list of terms terminated by a "|"-separated term. The latter being a syntactic marker to denote the tail of the binary list.

In another exemplary embodiment, the process 600 continues from 504 to 606 where a backward inference layer in the semantic data architecture is provided. The backward inference layer is formed by the at least one processor, the at least one storage device, the at least one memory, and the at least one communication interface in combination with a backward inference application program stored in the at least one storage device. The at least one processor, in conjunction running the backward inference application program, is configured to use the at least one storage device, the at least one memory, and the at least one communication interface to i) selectively receive at least a portion of the filtered data from the data filtering layer, ii) process the corresponding filtered data using a symmetric matching process to evaluate matching rules and explore solutions to form matching conditions using an iterative strategy, and iii) store the matching conditions in the at least one storage device. In this embodiment, the process 600 may continue from 606 to 608 or return to 506 of FIG. 5. The backward inference layer may be provided on one or more computer platforms. The one or more computer platforms providing the backward inference layer may include a server computer platform, a client computer platform, and a standalone computer platform in any suitable combination. The one or more computer platforms providing the backward inference layer may be different computer platforms from those which provide the data model layer and data filtering layer. Alternatively, any computer platform may provide the backward inference layer, data model layer, and data filtering layer or portions thereof in any combination.

In a further embodiment of this process 600, the backward inference layer includes an rules function in conjunction with forming the matching conditions, the rules function defined by the following expression:

$$T((\Leftarrow(?x?y)))::=T(?x), \Leftarrow L(?y)//,$$

where T represents a syntactic term (a meta-term), ?x represents a filtering term to match a sub-term (intended to be a goal of the backward rule), ?y represents a filtering term to match another sub-term (a list of terms intended to be the conditions of the backward rule), and L represents a meta-term used for parsing a list of terms.

In another further embodiment of this process 600, the backward inference layer includes an evaluation function in conjunction with forming the matching conditions, the evaluation function defined by at least one of the following expressions:

$$
\begin{aligned}
\text{eval}(C,\text{infer}(t)) &= s:=(\Leftarrow(?\text{goal }?\text{cond})) \\
&\quad \text{for } (c, \phi) \in \text{eval}(C, \text{read-fresh}(s)) \{ \\
&\quad\quad \text{if Smatch}(t, \phi(?\text{goal})) = \Phi \{ \\
&\quad\quad\quad \text{for } (c_2, \phi') \in \text{eval}(c, \text{inferL}(\Phi(\phi(?\text{cond})))) \{ \\
&\quad\quad\quad\quad \text{yield}(c_2, \Phi \cup \phi') \\
&\quad\quad\quad \} \\
&\quad\quad \} \\
&\quad \} , \\
\text{eval}(C, \text{inferL}((t_1\ t_2))) &= \text{for } (c_1,\phi_1) \in \text{eval}(C, \text{infer}(t_1))\{ \\
&\quad \text{for } (c_2, \phi_2) \in \text{eval}(c_1, \text{inferL}(\phi_1(t_2))) \\
&\quad \{\text{yield}(c_2,\phi_1 \cup \phi_2)\} \\
&\quad \} , \\
\text{eval}(C, \text{inferL}(\text{nil})) &= \text{yield}(C, \emptyset) \quad , \text{ and} \\
\text{eval}(C, \text{read-fresh}(t)) &= (\text{for } (c, \phi) \in \text{eval}(C, \text{read}(t))\{ \\
&\quad \text{If match}(\text{refresh}(\phi(t)),t) = \Phi \{\text{yield}(c, \Phi)\} \\
&\quad \} ,
\end{aligned}
$$

where C represents the current context stack, t represents a binary tree, s represents an intermediate term used to filter out backward rules, c represents the intermediate context stacks returned by the eval function, φ represents the substitution returned by the eval function, and Φ represents the substitution returned by the match primitive.

In another exemplary embodiment, the process 600 continues from 504 to 608 where a primitive functions layer in the semantic data architecture is provided. The primitive functions layer is formed by the at least one processor, the at least one storage device, the at least one memory, and the at least one communication interface in combination with a primitive functions application program stored in the at least one storage device. The at least one processor, in conjunction running the primitive functions application program, is configured to use the at least one storage device, the at least one memory, and the at least one communication interface to i) selectively receive at least a portion of the filtered data from the data filtering layer, ii) process the corresponding filtered data using the primitive functions application program to identify a predetermined set of logical operations, and iii) store identified logical operations in the at least one storage device. In this embodiment, the process 600 may continue from 608 to 610 or return to 506 of FIG. 5. The primitive functions layer may be provided on one or more computer platforms. The one or more computer platforms providing the primitive functions layer may include a server computer platform, a client computer platform, and a standalone computer platform in any suitable combination. The one or more computer platforms providing the primitive functions layer may be different computer platforms from those which provide the data model layer and data filtering layer. Alternatively, any computer platform may provide the primitive functions layer, data model layer, and data filtering layer or portions thereof in any combination.

In another exemplary embodiment, the process 600 continues from 504 to 610 where a rewriting engine layer in the semantic data architecture is provided. The rewriting engine layer is formed by the at least one processor, the at least one storage device, the at least one memory, and the at least one communication interface in combination with a rewriting engine application program stored in the at least one storage device. The at least one processor, in conjunction running the rewriting engine application program, is configured to use the at least one storage device, the at least one memory, and the at least one communication interface to i) selectively receive at least a portion of the filtered data from the data filtering layer, ii) process the corresponding filtered data using the rewriting engine application program to transform terms within the filtered data to form transformed data when a predetermined condition is satisfied, and iii) store the transformed data in the at least one storage device. In this embodiment, the process 600 may return to 506 of FIG. 5 from 610. The rewriting engine layer may be provided on one or more computer platforms. The one or more computer platforms providing the rewriting engine layer may include a server computer platform, a client computer platform, and a standalone computer platform in any suitable combination. The one or more computer platforms providing the rewriting engine layer may be different computer platforms from those which provide the data model layer and data filtering layer. Alternatively, any computer platform may provide the rewriting engine layer, data model layer, and data filtering layer or portions thereof in any combination.

In a further embodiment of this process 600, the rewriting engine layer includes an evaluation function in conjunction with forming the transformed data, the evaluation function defined by the following expressions:

$$x := \text{refresh}(?x)$$

$$\text{eval}(C,\text{rewrite}(t)) = s := (\rightarrow(tx)),$$

$$\text{for}(c,\phi) \in \text{eval}(C,\text{infer}(s))\{\text{yield}(c,\phi(x))\}$$

where C represents the current context stack, t represents a binary tree, x represents a temporary filtering term, s represents a variable to store a filtering term used to filter out forward rules, c represents the context as returned by the eval function, and Φ represents a substitution as returned by the eval function.

In another further embodiment of this process 600, the rewriting engine layer includes a reflexive transitive computing function in conjunction with forming the transformed data, the reflexive transitive computing function defined by the following expressions:

$$\text{Compute}(?X,?Y) \Leftarrow \text{REWRITE}(?X,?X'), R\text{Compute}(?X',?Y)$$

$$R\text{Compute}(?X,?Y) \Leftarrow \text{OR}(\text{Compute}(?X,?Y), \text{MATCH}(?X,?Y)),$$

where ?X, ?X', and, ?Y represent the intermediate filtering variable needed by the rule.

Figure 7:
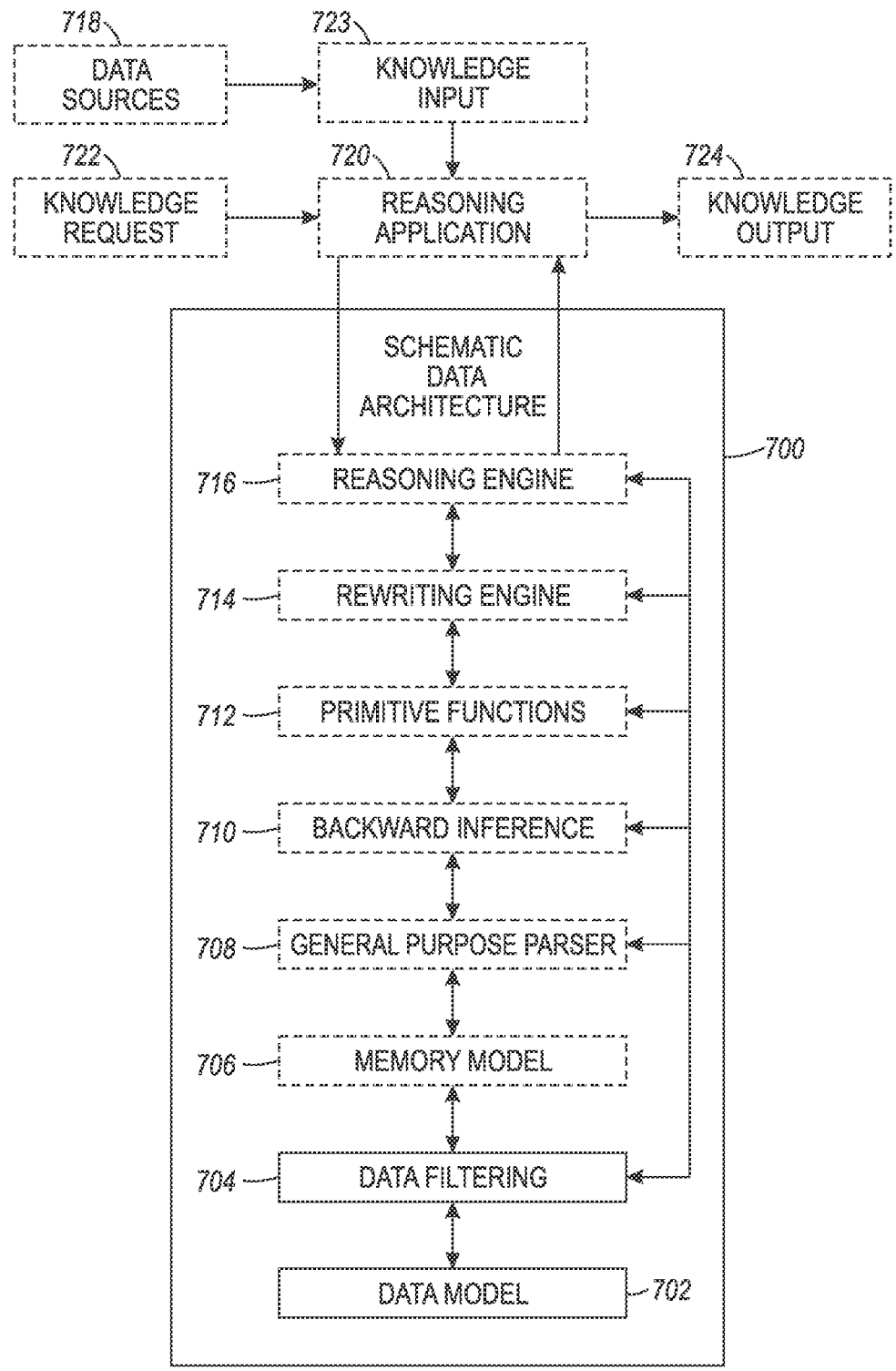
FIG. 7 is a block diagram of an exemplary embodiment of a semantic data architecture.

With reference to FIG. 7, an exemplary embodiment of a semantic data architecture 700 includes a data model layer 702 and a data filtering layer 704. Various other embodiments of the apparatus 700 may also include a memory model layer 706, a general purpose parser layer 708, a backward inference layer 710, a primitive functions layer 712, a rewriting engine layer 714, and a reasoning engine layer 716. The reasoning engine layer 716 may support communications with one or more reasoning application 720 in conjunction with receiving a knowledge request 722 and knowledge input 723. The knowledge input 723 may support communications with one or more data source(s) 718 to obtain source data. The semantic data architecture 700 is equipped to process the knowledge request 722 and knowledge input 723 to provide a corresponding knowledge output 724 to the reasoning application 720 via the reasoning engine layer 716.

Figure 8:
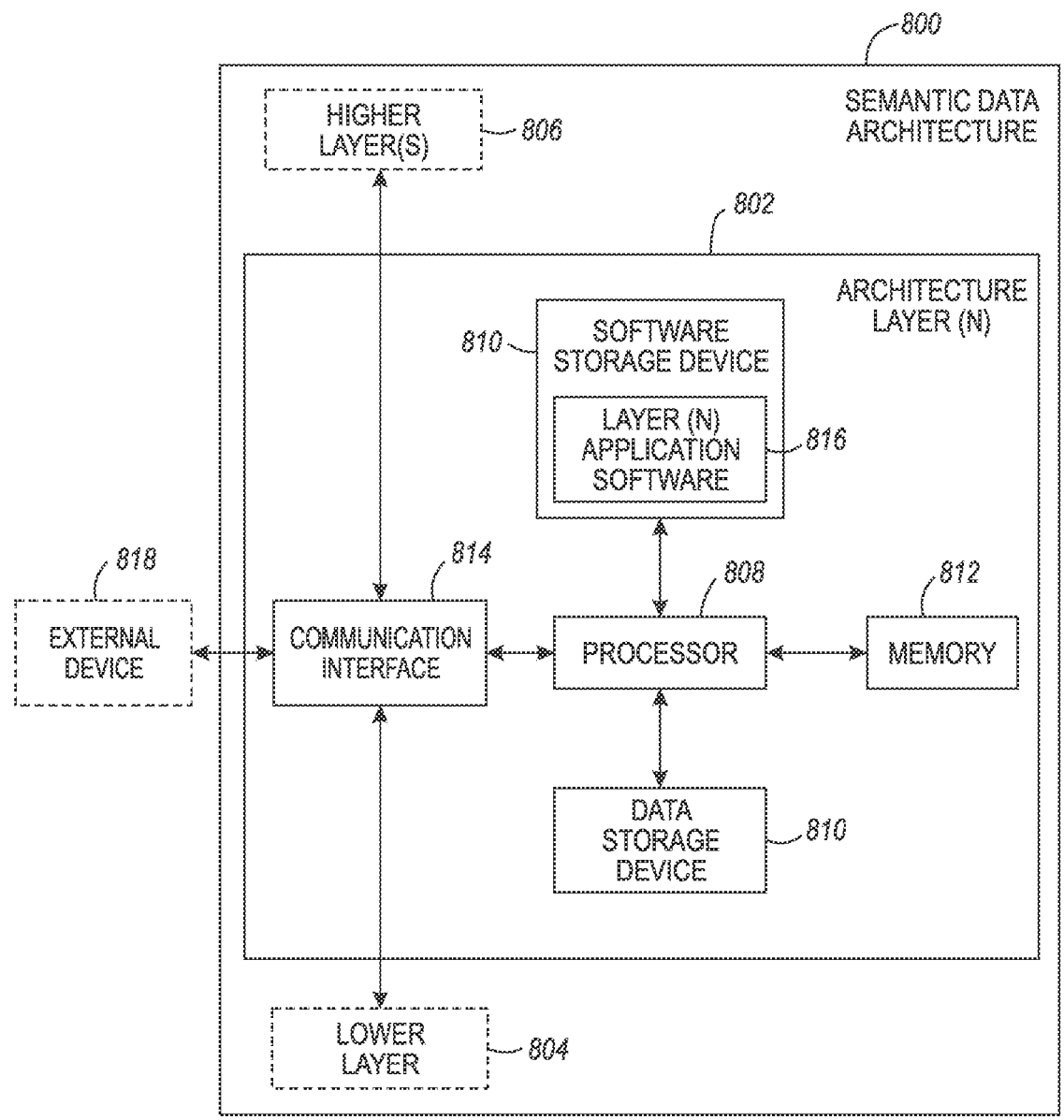
FIG. 8 is a block diagram of another exemplary embodiment of a semantic data architecture.

With reference to FIG. 8, another exemplary embodiment of a semantic data architecture 800 includes an exemplary layer 802 of the architecture. From the perspective of the exemplary layer (e.g., layer N) 802, the semantic data architecture may include a lower layer 804 and one or more higher layer(s) 806. As shown, the exemplary layer 802, includes at least one processor 808, at least one storage device 810, at least one memory 812, and at least one communication interface 814. The at least one storage device 810 is configured to store an application program 816 for the exemplary layer 802 such that the at least one processor 808, the at least one storage device 810, the at least one memory 812, and the at least one communication interface 814, in combination with the application program 816, form the exemplary layer 802 in the semantic data architecture 800. The at least one processor 808, in conjunction with running the application program 816, is configured to use the at least one storage device 810, the at least one memory 812, and the at least one communication interface 814 to perform one or more functional process provided by the exemplary layer 802. The communication interface 814 may support communications with one or more external device 818.

With reference to FIGS. 7 and 8, yet another embodiment of the semantic data architecture 700 includes at least one processor 808, at least one storage device 810, at least one memory 812, and at least one communication interface 814. The at least one storage device 810 is configured to store a data model application program 816 such that the at least one processor 808, the at least one storage device 810, the at least one memory 812, and the at least one communication interface 814, in combination with the data model application program 816, form a data model layer 702 in the semantic data architecture 700. The at least one processor 808, in conjunction with running the data model application program 816, is configured to use the at least one storage device 810, the at least one memory 812, and the at least one communication interface 814 to i) selectively receive source data from a source device 718, ii) process the corresponding source data based at least in part on pre-defined data types and filtering terms to form semantic data arranged in one or more binary tree structures, and iii) store the semantic data in the at least one storage device 810. The data model layer 702 may be provided on one or more computer platforms. The one or more computer platforms providing the data model layer 702 may include a server computer platform, a client computer platform, and a standalone computer platform in any suitable combination. The one or more computer platforms providing the data model layer 702 may be different computer platforms from those which provide the other layers. Alternatively, any computer platform may provide the data model layer 702 and other layers or portions thereof.

In this embodiment, the at least one storage device 810 is configured to store a data filtering application program 816 such that the at least one processor 808, the at least one storage device 810, the at least one memory 812, and the at least one communication interface 814, in combination with the data filtering application program 816, form a data filtering layer 704 in the semantic data architecture 700. The at least one processor 808, in conjunction running the data filtering application program 816, is configured to use the at least one storage device 810, the at least one memory 812, and the at least one communication interface 814 to i) selectively receive at least a portion of the semantic data from the data model layer 702, ii) process the corresponding semantic data using a reflexive matching operation based at least in part on the filtering terms to filter data through substitution to form filtered data, and iii) store the filtered data in the at least one storage device 810. The data filtering layer 704 may be provided on one or more computer platforms. The one or more computer platforms providing the data filtering layer 704 may include a server computer platform, a client computer platform, and a standalone computer platform in any suitable combination. The one or more computer platforms providing the data filtering layer 704 may be different computer platforms from those which provide the other layers. Alternatively, any computer platform may provide the data filtering layer 704 and other layers or portions thereof.

In still another embodiment of the semantic data architecture 700, the at least one storage device 810 is configured to store a reasoning engine application program 816 such that the at least one processor 808, the at least one storage device 810, the at least one memory 812, and the at least one communication interface 814, in combination with the reasoning engine application program 816, form a reasoning engine layer 716 in the semantic data architecture 700. The at least one processor 808, in conjunction running the reasoning engine application program 816, is configured to use the at least one storage device 810, the at least one memory 812, and the at least one communication interface 814 to i) selectively receive at least a portion of the filtered data from the data filtering layer 804, ii) process the corresponding filtered data based at least in part on one or more select tactics of a set of primitive tactics to form knowledge data, and iii) store the knowledge data in the at least one storage device 810. In a further embodiment, the semantic data architecture 700 is configured to form the knowledge data 724 in relation to a knowledge request 722. The reasoning engine layer 716 may be provided on one or more computer platforms. The one or more computer platforms providing the reasoning engine layer 716 may include a server computer platform, a client computer platform, and a standalone computer platform in any suitable combination. The one or more computer platforms providing the reasoning engine layer 716 may be different computer platforms from those which provide the other layers. Alternatively, any computer platform may provide the reasoning engine layer 716 and other layers or portions thereof in any combination.

In still yet another embodiment of the semantic data architecture 700, the reflexive matching operation associated with the data filtering layer 704 includes an asymmetric matching function defined by the following expression:

$$\text{match}(t, \widehat{t'}) = \Phi \Rightarrow \Phi(\widehat{t'}) = t,$$

where t represents a binary tree, $\widehat{t'}$ represents a normalized term as defined above, and $\Phi$ represents a substitution.

In another embodiment of the semantic data architecture 700, the reflexive matching operation associated with the data filtering layer 704 includes an asymmetric matching function defined by at least one of the following expressions:

$$\text{match}(v,v)=\{\ \},$$

$$\text{match}(v,?:\tau)=\{\ \}\ \text{if}\ v\in\tau,$$

$$\text{match}(v,?x:\tau)=\{?x:\tau \mapsto t\}\ \text{if}\ v\ \text{has type}\ \tau,$$

$$\text{match}(t,?x)=\{?x \mapsto t\},$$

$$\text{match}(t,?)=\{\ \},$$

$$\text{match}((t_1 t_2),(t'_1 t'_2))=\phi_1 \cup \phi_2$$

$$\text{if match}(t_1,t'_1)=\phi_1 \wedge \text{match}(\phi_1(t_2),t'_2)=\phi_2,$$

$$\text{match}(f,?^{(n+1)}x)=\{?^{(n+1)}x \mapsto f\}\ \text{if}\ f \in \{?^n y, ?^n y:\tau, ?^n:\tau\},$$

$$\text{match}(?^n y:\tau, ?^{(n+1)}X:\tau)=\{?^{(n+1)}x:\tau \mapsto ?^n y:\tau\},\ \text{and}$$

$$\text{match}(f, \Rightarrow^{(n+1)})=\{\ \}\ \text{if}\ f \in \{?^n y, ?^n, ?^n y:\tau, ?^n:\tau\},$$

where v represents a value for a data type, τ represents a type, (x, y) are symbols, t and t' represent binary trees, Φ represents a substitution, n a positive integer, and f represents a filtering term.

In yet another embodiment of the semantic data architecture 700, the reflexive matching operation associated with the data filtering layer 704 includes a symmetric matching function defined by at least one of the following expressions:

$$\text{Smatch}(\alpha_1,\alpha_2)=\phi\ \text{if match}(\alpha_1,\alpha_2)=\phi\ \text{or otherwise,if}$$
$$\text{match}(\alpha_2,\alpha_1)=\phi,$$

and $$\text{Smatch}((t_1 t_2),(t'_1 t'_2))=\phi_1 \cup \phi_2$$

$$\text{if Smatch}(t_1,t'_1)=\phi_1 \wedge \text{Smatch}(\phi_1(t_2),(t'_2))=\phi_2,$$

where α represents atoms, Φ represents a substitution, t represents a binary tree, and t' represents a filtering term.

In still another embodiment of the semantic data architecture 700, the reflexive matching operation associated with the data filtering layer 704 includes a symmetric matching function defined by the following expression:

$$\text{Smatch}(\hat{t}_1,\hat{t}_2)=\Phi \Rightarrow (\hat{t}_1)=\Phi(\hat{t}_2)$$

where $\hat{t}$ represents a normalized term as defined above and Φ represents a substitution.

In still yet another embodiment of the semantic data architecture 700, the at least one storage device 810 is configured to store a memory model application program 816 such that the at least one processor 808, the at least one storage device 810, the at least one memory 812, and the at least one communication interface 814, in combination with the memory model application program 816, form a memory model layer 706 in the semantic data architecture 700. The at least one processor 808, in conjunction running the memory model application program 816, is configured to use the at least one storage device 810, the at least one memory 812, and the at least one communication interface 814 to i) selectively receive one or more of at least a portion of the semantic data from the data model layer 702 and at least a portion of the filtered data from the data filtering layer 704, ii) process the corresponding semantic data and filtered data to form corresponding ordered stacks of data stores with execution contexts and associative terms for access to the data stores, and iii) store the corresponding semantic data and filtered data in an associative memory manner in the at least one storage device 810. The memory model layer 706 may be provided on one or more computer platforms. The one or more computer platforms providing the memory model layer 706 may include a server computer platform, a client computer platform, and a standalone computer platform in any suitable combination. The one or more computer platforms providing the memory model layer 706 may be different computer platforms from those which provide the other layers. Alternatively, any computer platform may provide the memory model layer 706 and other layers or portions thereof in any combination.

In another embodiment of the semantic data architecture 700, the at least one storage device 810 is configured to store a general purpose parser application program 816 such that the at least one processor 808, the at least one storage device 810, the at least one memory 812, and the at least one communication interface 814, in combination with the general purpose parser application program 816, form a general purpose parser layer 708 in the semantic data architecture 700. The at least one processor 808, in conjunction running the general purpose parser application program 816, is configured to use the at least one storage device 810, the at least one memory 812, and the at least one communication interface 814 to i) selectively receive at least a portion of the filtered data from the data filtering layer, ii) process the corresponding filtered data to dynamically recognize terms of a predetermined programming language based at least in part on functional call notation and relational data structure notation to produce parsing results as parsed trees conforming to the binary trees of the data model layer, and iii) store the parsing results in the at least one storage device 810. The general purpose parser layer 708 may be provided on one or more computer platforms. The one or more computer platforms providing the general purpose parser layer 708 may include a server computer platform, a client computer platform, and a standalone computer platform in any suitable combination. The one or more computer platforms providing the general purpose parser layer 708 may be different computer platforms from those which provide the other layers. Alternatively, any computer platform may provide the general purpose parser layer 708 and other layers or portions thereof in any combination.

In yet another embodiment of the semantic data architecture 700, the at least one storage device 810 is configured to store a backward inference application program 816 such that the at least one processor 808, the at least one storage device 810, the at least one memory 812, and the at least one communication interface 814, in combination with the backward inference application program 816, form a backward inference layer 710 in the semantic data architecture 700. The at least one processor 808, in conjunction running the backward inference application program 816, is configured to use the at least one storage device 810, the at least one memory 812, and the at least one communication interface 814 to i) selectively receive at least a portion of the filtered data from the data filtering layer 704, ii) process the corresponding filtered data using a symmetric matching process to evaluate matching rules and explore solutions to form matching conditions using an iterative strategy, and ii) store the matching conditions in the at least one storage device 810. The backward inference layer 710 may be provided on one or more computer platforms. The one or more computer platforms providing the backward inference layer 710 may include a server computer platform, a client computer platform, and a standalone computer platform in any suitable combination. The one or more computer platforms providing the backward inference layer 710 may be different computer platforms from those which provide the other layers. Alternatively, any computer platform may provide the backward inference layer 710 and other layers or portions thereof in any combination.

In yet another embodiment of the semantic data architecture 700, the at least one storage device 810 is configured to store a primitive functions application program 816 such that the at least one processor 808, the at least one storage device 810, the at least one memory 812, and the at least one communication interface 814, in combination with the primitive functions application program 816, form a primitive functions layer 712 in the semantic data architecture 700. The at least one processor 808, in conjunction running the primitive functions application program 816, is configured to use the at least one storage device 810, the at least one memory 812, and the at least one communication interface 814 to i) selectively receive at least a portion of the filtered data from the data filtering layer 704, ii) process the corresponding filtered data using the primitive functions application program to identify a predetermined set of logical operations, and iii) store identified logical operations in the at least one storage device 810. The primitive functions layer 712 may be provided on one or more computer platforms. The one or more computer platforms providing the primitive functions layer 712 may include a server computer platform, a client computer platform, and a standalone computer platform in any suitable combination. The one or more computer platforms providing the primitive functions layer 712 may be different computer platforms from those which provide other layers. Alternatively, any computer platform may provide the primitive functions layer 712 and other layers or portions thereof in any combination.

In yet another embodiment of the semantic data architecture 700, the at least one storage device 810 is configured to store a rewriting engine application program 816 such that the at least one processor 808, the at least one storage device 810, the at least one memory 812, and the at least one communication interface 814, in combination with the rewriting engine application program 816, form a rewriting engine layer 714 in the semantic data architecture 700. The at least one processor 808, in conjunction running the rewriting engine application program 816, is configured to use the at least one storage device 810, the at least one memory 812, and the at least one communication interface 814 to i) selectively receive at least a portion of the filtered data from the data filtering layer 704, ii) process the corresponding filtered data using the rewriting engine application program 816 to transform terms within the filtered data to form transformed data when a predetermined condition is satisfied, and iii) store the transformed data in the at least one storage device 810. The rewriting engine layer 714 may be provided on one or more computer platforms. The one or more computer platforms providing the rewriting engine layer 714 may include a server computer platform, a client computer platform, and a standalone computer platform in any suitable combination. The one or more computer platforms providing the rewriting engine layer 714 may be different computer platforms from those which provide other layers. Alternatively, any computer platform may provide the rewriting engine layer 714 and other layers or portions thereof in any combination.

With reference to FIGS. 5 and 6, various exemplary embodiments of non-transitory computer-readable medium storing program instructions that, when executed by at least one processor, cause a corresponding processor-controlled device to perform a method of providing a semantic data architecture. For example, various embodiments of the semantic data architecture 700, 800 are described above with reference to FIGS. 7 and 8. Various embodiments of the method of providing a semantic data architecture 500, 600, for example, are described above with reference to FIGS. 5 and 6.

In addition to the disclosure above, various exemplary embodiments of non-transitory computer-readable medium are disclosed herein. The various embodiments of non-transitory computer-readable medium store program instructions that, when executed by at least one processor, may cause a corresponding processor-controlled device to perform various combinations of functions associated with the various embodiments of the processes 500, 600 for providing a semantic data architecture described above with reference to FIGS. 5 and 6. For example, the various embodiments of the semantic data architecture 700, 800 described above with reference to FIGS. 7 and 8 may include the at least one processor 808 and may perform the various combination of functions associated with providing a semantic data architecture 700, 800 based on the program instructions stored on corresponding embodiments of the non-transitory computer readable medium. The program instructions, for example, may include the data model application program associated with the data model layer 702, the data filtering application program associated with the data filtering layer 704, the memory model application program associated with the memory model layer 706, the general purpose parser application program associated with the general purpose parser layer 708, the backward inference application program associated with the backward inference layer 710, the primitive functions application program associated with the primitive functions layer 712, the rewriting engine application program associated with the rewriting engine layer 714, or the reasoning engine application program associated with the reasoning engine layer 716 in any suitable combination.

In other words, the program instructions of the various exemplary embodiments of non-transitory computer-readable medium are defined by any suitable combination of the processes 500, 600 described above with reference to FIGS. 5 and 6. Similarly, the at least one processor 808 and the semantic data architecture 700, 800 associated with the various exemplary embodiments of non-transitory computer-readable medium are defined by any suitable combination of the semantic data architecture 700, 800 described above with reference to FIGS. 7 and 8.

It will be appreciated that variants of the above-disclosed and other features and functions, or alternatives thereof, may be combined into many other different computer platforms, computer applications, or combinations thereof. Various presently unforeseen or unanticipated alternatives, modifications, variations, or improvements therein may be subsequently made by those skilled in the art which are also intended to be encompassed by the following claims.

What is claimed is:

1. A method of providing a semantic data architecture, comprising:

providing a data model layer in the semantic data architecture, wherein the data model layer is formed by at least one processor, at least one storage device, at least one memory, and at least one communication interface in combination with a data model application program stored in the at least one storage device, wherein the at least one processor, in conjunction with running the data model application program, is configured to use the at least one storage device, the at least one memory, and the at least one communication interface to selectively receive source data from a source device, process the source data received from the source device based at least in part on pre-defined data types and filtering terms to form semantic data arranged in one or more binary tree structures, and store the semantic data in the at least one storage device; and providing a data filtering layer in the semantic data architecture, wherein the data filtering layer is formed by the at least one processor, the at least one storage device, the at least one memory, and the at least one communication interface in combination with a data filtering application program stored in the at least one storage device, wherein the at least one processor, in conjunction running the data filtering application program, is configured to use the at least one storage device, the at least one memory, and the at least one communication interface to selectively receive at least a portion of the semantic data from the data model layer, process the semantic data received from the data model layer using a reflexive matching operation based at least in part on the filtering terms to filter data through substitution to form filtered data, and store the filtered data in the at least one storage device.

2. The method of claim 1, further comprising:

providing a reasoning engine layer in the semantic data architecture, wherein the reasoning engine layer is formed by the at least one processor, the at least one storage device, the at least one memory, and the at least one communication interface in combination with a reasoning engine application program stored in the at least one storage device, wherein the at least one processor, in conjunction running the reasoning engine application program, is configured to use the at least one storage device, the at least one memory, and the at least one communication interface to selectively receive at least a portion of the filtered data from the data filtering layer, process the filtered data received from the data filtering layer based at least in part on one or more select tactics of a set of primitive tactics to form knowledge data, and store the knowledge data in the at least one storage device.

3. The method of claim 2 wherein the semantic data architecture is configured to form the knowledge data in relation to a knowledge request.

4. The method of claim 1 wherein the reflexive matching operation associated with the data filtering layer includes an asymmetric matching function defined by the following expression:

$$\text{match}(t, \hat{t'}) = \Phi \Rightarrow \Phi(\hat{t'}) = t,$$

where $t$ represents a binary tree, $\hat{t'}$ represents a normalized term, and $\Phi$ represents a substitution.

5. The method of claim 1 wherein the reflexive matching operation associated with the data filtering layer includes an asymmetric matching function defined by at least one of the following expressions:

$$\text{match}(v,v) = \{\ \},$$

$$\text{match}(v, ?:\tau) = \{\ \} \text{ if } v \in \tau,$$

$$\text{match}(v, ?x:\tau) = \{?x:\tau \mapsto t\} \text{ if } v \text{ has type } \tau,$$

$$\text{match}(t, ?x) = \{?x \mapsto t\},$$

$$\text{match}(t, ?)\{\ \},$$

$$\text{match}((t_1 t_2),(t'_1 t'_2)) = \phi_1 \cup \phi_2,$$

if $\text{match}(t_1, t'_2) = \phi_1 \wedge \text{match}(\phi_1(t_2), t'_2) = \phi_2$, $$\text{match}(f, ?^{(n+1)}x) = \{?^{(n+1)}x \mapsto f\} \text{ if } f \in \{?^n y, ?^n, ?^n y:\tau, ?^n:\tau\}$$
for a, variable $y$ $$\text{match}(?^n y:\tau, ?^{(n+1)}x:\tau) = \{?^{(n+1)}x:\tau \mapsto ?^n y:\tau\}, \text{ and}$$

$$\text{match}(f, ?^{(n+1)}) = \{\ \} \text{ if } f \in \{?^n y, ?^n, ?^n y:\tau, ?^n:\tau\} \text{ for the variable } y,$$

where $v$ represents a value of data type, $\tau$ represents a type, $(x,y)$ are symbols, $t$ and $t'$ represent binary trees, $\Phi$ represents a substitution, $n$ a positive integer, and $f$ represents a terminal filtering term.

6. The method of claim 1 wherein the reflexive matching operation associated with the data filtering layer includes a symmetric matching function defined by at least one of the following expressions:

$$\text{Smatch}(\alpha_1,\alpha_2) = \phi \text{ if match}(\alpha_1,\alpha_2) = \phi \text{ or otherwise, if match}(\alpha_2,\alpha_1) = \phi,$$

and $$\text{Smatch}((t_1 t_2),(t'_1 t'_2)) = \phi_1 \cup \phi_2$$

if $\text{Smatch}(t_1,t'_1) = \phi_1 \wedge \text{Smatch}(\phi_1(t_2),\phi_1(t'_2)) = \phi_2,$ where $\alpha$ represents atoms, $\Phi$ represents a substitution, and $t$ and $t'$ represent binary trees.

7. The method of claim 1 wherein the reflexive matching operation associated with the data filtering layer includes a symmetric matching function defined by the following expression:

$$\text{Smatch}(\hat{t}_1,\hat{t}_2) = \Phi \Rightarrow \Phi(\hat{t}_1) = \Phi(\hat{t}_2)$$

where $\hat{t}_1$ and $\hat{t}_2$ represent normalized terms and $\Phi$ represents a substitution.

8. The method of claim 1, further comprising:

providing a memory model layer in the semantic data architecture, wherein the memory model layer is formed by the at least one processor, the at least one storage device, the at least one memory, and the at least one communication interface in combination with a memory model application program stored in the at least one storage device, wherein the at least one processor, in conjunction running the memory model application program, is configured to use the at least one storage device, the at least one memory, and the at least one communication interface to selectively receive one or more of at least a portion of the semantic data from the data model layer and at least a portion of the filtered data from the data filtering layer, process the semantic data received from the data model layer and the filtered data received from the data filtering layer to form ordered stacks of data stores with execution contexts and associative terms for access to the data stores, and store the semantic data received from the data model layer and the filtered data received from the data filtering layer in an associative memory manner in the at least one storage device.

9. The method of claim 1, further comprising:

providing a general purpose parser layer in the semantic data architecture, wherein the general purpose parser layer is formed by the at least one processor, the at least one storage device, the at least one memory, and the at least one communication interface in combination with a general purpose parser application program stored in the at least one storage device, wherein the at least one processor, in conjunction running the general purpose parser application program, is configured to use the at least one storage device, the at least one memory, and the at least one communication interface to selectively receive at least a portion of the filtered data from the data filtering layer, process the filtered data received from the data filtering layer to dynamically recognize terms of a predetermined programming language based at least in part on functional call notation and relational data structure notation to produce parsing results as parsed trees conforming to the binary trees of the data model layer, and store the parsing results in the at least one storage device.

10. The method of claim 1, further comprising:
providing a backward inference layer in the semantic data architecture, wherein the backward inference layer is formed by the at least one processor, the at least one storage device, the at least one memory, and the at least one communication interface in combination with a backward inference application program stored in the at least one storage device, wherein the at least one processor, in conjunction running the backward inference application program, is configured to use the at least one storage device, the at least one memory, and the at least one communication interface to selectively receive at least a portion of the filtered data from the data filtering layer, process the filtered data received from the data filtering layer using a symmetric matching process to evaluate matching rules and explore solutions to form matching conditions using an iterative strategy, and store the matching conditions in the at least one storage device.

11. The method of claim 1, further comprising:
providing a primitive functions layer in the semantic data architecture, wherein the primitive functions layer is formed by the at least one processor, the at least one storage device, the at least one memory, and the at least one communication interface in combination with a primitive functions application program stored in the at least one storage device, wherein the at least one processor, in conjunction running the primitive functions application program, is configured to use the at least one storage device, the at least one memory, and the at least one communication interface to selectively receive at least a portion of the filtered data from the data filtering layer, process the filtered data received from the data filtering layer using the primitive functions application program to identify a predetermined set of logical operations, and store identified logical operations in the at least one storage device.

12. The method of claim 1, further comprising:
providing a rewriting engine layer in the semantic data architecture, wherein the rewriting engine layer is formed by the at least one processor, the at least one storage device, the at least one memory, and the at least one communication interface in combination with a rewriting engine application program stored in the at least one storage device, wherein the at least one processor, in conjunction running the rewriting engine application program, is configured to use the at least one storage device, the at least one memory, and the at least one communication interface to selectively receive at least a portion of the filtered data from the data filtering layer, process the filtered data received from the data filtering layer using the rewriting engine application program to transform terms within the filtered data to form transformed data when a predetermined condition is satisfied, and store the transformed data in the at least one storage device.

13. An apparatus for providing a semantic data architecture, comprising:
at least one processor;
at least one storage device;
at least one memory; and
at least one communication interface;
wherein the at least one storage device is configured to store a data model application program such that the at least one processor, the at least one storage device, the at least one memory, and the at least one communication interface, in combination with the data model application program, form a data model layer in the semantic data architecture, wherein the at least one processor, in conjunction with running the data model application program, is configured to use the at least one storage device, the at least one memory, and the at least one communication interface to selectively receive source data from a source device, process the source data received from the source device based at least in part on pre-defined data types and filtering terms to form semantic data arranged in one or more binary tree structures, and store the semantic data in the at least one storage device;
wherein the at least one storage device is configured to store a data filtering application program such that the at least one processor, the at least one storage device, the at least one memory, and the at least one communication interface, in combination with the data filtering application program, form a data filtering layer in the semantic data architecture, wherein the at least one processor, in conjunction running the data filtering application program, is configured to use the at least one storage device, the at least one memory, and the at least one communication interface to selectively receive at least a portion of the semantic data from the data model layer, process the semantic data received from the data model layer using a reflexive matching operation based at least in part on the filtering terms to filter data through substitution to form filtered data, and store the filtered data in the at least one storage device.

14. The apparatus of claim 13 wherein the at least one storage device is configured to store a reasoning engine application program such that the at least one processor, the at least one storage device, the at least one memory, and the at least one communication interface, in combination with the reasoning engine application program, form a reasoning engine layer in the semantic data architecture, wherein the at least one processor, in conjunction running the reasoning engine application program, is configured to use the at least one storage device, the at least one memory, and the at least one communication interface to selectively receive at least a portion of the filtered data from the data filtering layer, process the filtered data received from the data filtering layer based at least in part on one or more select tactics of a set of primitive tactics to form knowledge data, and store the knowledge data in the at least one storage device.

15. The apparatus of claim 13 wherein the at least one storage device is configured to store a memory model application program such that the at least one processor, the at least one storage device, the at least one memory, and the at least one communication interface, in combination with the memory model application program, form a memory model layer in the semantic data architecture, wherein the at least one processor, in conjunction running the memory model application program, is configured to use the at least one storage device, the at least one memory, and the at least one communication interface to selectively receive one or more of at least a portion of the semantic data from the data model layer and at least a portion of the filtered data from the data filtering layer, process the semantic data received from the data model layer and the filtered data received from the data filtering layer to form ordered stacks of data stores with execution contexts and associative terms for access to the data stores, and store the semantic data received from the data model layer and the filtered data received from the data filtering layer in an associative memory manner in the at least one storage device.

16. The apparatus of claim 13 wherein the at least one storage device is configured to store a general purpose parser application program such that the at least one processor, the at least one storage device, the at least one memory, and the at least one communication interface, in combination with the general purpose parser application program, form a general purpose parser layer in the semantic data architecture, wherein the at least one processor, in conjunction running the general purpose parser application program, is configured to use the at least one storage device, the at least one memory, and the at least one communication interface to selectively receive at least a portion of the filtered data from the data filtering layer, process the filtered data received from the data filtering layer to dynamically recognize terms of a predetermined programming language based at least in part on functional call notation and relational data structure notation to produce parsing results as parsed trees conforming to the binary trees of the data model layer, and store the parsing results in the at least one storage device.

17. The apparatus of claim 13 wherein the at least one storage device is configured to store a backward inference application program such that the at least one processor, the at least one storage device, the at least one memory, and the at least one communication interface, in combination with the backward inference application program, form a backward inference layer in the semantic data architecture, wherein the at least one processor, in conjunction running the backward inference application program, is configured to use the at least one storage device, the at least one memory, and the at least one communication interface to selectively receive at least a portion of the filtered data from the data filtering layer, process the filtered data received from the data filtering layer using a symmetric matching process to evaluate matching rules and explore solutions to form matching conditions using an iterative strategy, and store the matching conditions in the at least one storage device.

18. The apparatus of claim 13 wherein the at least one storage device is configured to store a primitive functions application program such that the at least one processor, the at least one storage device, the at least one memory, and the at least one communication interface, in combination with the primitive functions application program, form a primitive functions layer in the semantic data architecture, wherein the at least one processor, in conjunction running the primitive functions application program, is configured to use the at least one storage device, the at least one memory, and the at least one communication interface to selectively receive at least a portion of the filtered data from the data filtering layer, process the filtered data received from the data filtering layer using the primitive functions application program to identify a predetermined set of logical operations, and store identified logical operations in the at least one storage device.

19. The apparatus of claim 13 wherein the at least one storage device is configured to store a rewriting engine application program such that the at least one processor, the at least one storage device, the at least one memory, and the at least one communication interface, in combination with the rewriting engine application program, form a rewriting engine layer in the semantic data architecture, wherein the at least one processor, in conjunction running the rewriting engine application program, is configured to use the at least one storage device, the at least one memory, and the at least one communication interface to selectively receive at least a portion of the filtered data from the data filtering layer, process the filtered data received from the data filtering layer using the rewriting engine application program to transform terms within the filtered data to form transformed data when a predetermined condition is satisfied, and store the transformed data in the at least one storage device.

20. A non-transitory computer-readable medium storing program instructions that, when executed by at least one processor, cause a processor-controlled device to perform a method of providing a semantic data architecture, the method comprising:
  providing a data model layer in the semantic data architecture, wherein the data model layer is formed by at least one processor, at least one storage device, at least one memory, and at least one communication interface in combination with a data model application program stored in the at least one storage device, wherein the at least one processor, in conjunction with running the data model application program, is configured to use the at least one storage device, the at least one memory, and the at least one communication interface to selectively receive source data from a source device, process the source data received from the source device based at least in part on pre-defined data types and filtering terms to form semantic data arranged in one or more binary tree structures, and store the semantic data in the at least one storage device; and
  providing a data filtering layer in the semantic data architecture, wherein the data filtering layer is formed by the at least one processor, the at least one storage device, the at least one memory, and the at least one communication interface in combination with a data filtering application program stored in the at least one storage device, wherein the at least one processor, in conjunction running the data filtering application program, is configured to use the at least one storage device, the at least one memory, and the at least one communication interface to selectively receive at least a portion of the semantic data from the data model layer, process the semantic data received from the data model layer using a reflexive matching operation based at least in part on the filtering terms to filter data through substitution to form filtered data, and store the filtered data in the at least one storage device.

* * * * *